United States Patent
Matsuda et al.

[11] Patent Number: 6,127,741
[45] Date of Patent: Oct. 3, 2000

[54] VEHICULAR USE POWER FEED APPARATUS

[75] Inventors: Yutaka Matsuda; Toshitaka Hara; Takezo Sugimura; Satoshi Kawai, all of Kanagawa, Japan

[73] Assignee: The Furukawa Electric Co., Ltd., Tokyo, Japan

[21] Appl. No.: 09/039,570

[22] Filed: Mar. 16, 1998

[30] Foreign Application Priority Data

| Mar. 17, 1997 | [JP] | Japan | 9-063624 |
| Mar. 17, 1997 | [JP] | Japan | 9-063672 |
| Mar. 24, 1997 | [JP] | Japan | 9-070224 |
| Mar. 28, 1997 | [JP] | Japan | 9-078526 |

[51] Int. Cl.$^7$ .................................................. H02H 3/04
[52] U.S. Cl. ......................... 307/36; 307/9.1; 307/10.6; 307/30; 361/59; 361/62
[58] Field of Search ............................ 307/10.1, 10.7, 307/30, 36, 38, 10.6, 9.1; 361/62, 66, 59, 93

[56] References Cited

U.S. PATENT DOCUMENTS

| 5,175,484 | 12/1992 | Withira et al. ......................... 307/10.6 |
| 5,654,859 | 8/1997 | Shi ............................................. 361/62 |
| 5,675,189 | 10/1997 | Anma et al. ............................ 307/10.1 |
| 5,818,673 | 10/1998 | Matsumaru et al. .................... 307/10.1 |

FOREIGN PATENT DOCUMENTS

| 57-80239 | 5/1982 | Japan . |
| 60-193746 | 10/1985 | Japan . |
| 5-64361 | 3/1993 | Japan . |
| 8-275408 | 10/1996 | Japan . |

*Primary Examiner*—Albert W. Paladini
*Attorney, Agent, or Firm*—Armstrong, Westerman, Hattori, McLeland & Naughton

[57] ABSTRACT

A vehicular use power feed apparatus comprising a battery and a plurality of power distribution units connected in a loop via power feed lines. Each power distribution unit has a current monitoring circuit, a current amount determination circuit, and a current direction determination circuit, detects the direction of current and magnitude of current flowing through the power feed line, and thereby detects an occurrence of a short-circuit. A control unit exchanges information regarding occurrence of short-circuits with adjoining power distribution units via a multiplex signal transmission unit so as to pinpoint the trouble point. The control unit operates the relay switch circuits on the two sides to break the connection so as to isolate the trouble point in cooperation with the control unit of the adjoining power distribution unit. The other relay switch circuit is operated to establish a connection so as to establish a new power feed line.

20 Claims, 15 Drawing Sheets

LEGEND
IU = INPUT UNIT
MSTU = MULTIPLEX SIGNAL TRANSMISSION UNIT

LEGEND

I U = INPUT UNIT
MSTU = MULTIPLEX SIGNAL TRANSMISSION UNIT

VEHICULAR USE POWER FEED APPARATUS

BACKGROUND OF THE INVENTION

1. Field of the Invention

The present invention relates to a vehicular use power feed apparatus for supplying power to various electrical components, devices, and apparatuses mounted in a vehicle, more particularly relates to a vehicular use power feed apparatus in which the route of the power fed to a plurality of electrical components is configured as a loop, trouble can be effectively detected, and the trouble portion cut out of the loop so that power can be fed to the other electrical components without hindrance.

2. Description of the Related Art

Recently, rapid progress has been made in the use of electronics in vehicles.

Vehicles, for example, various types of passenger cars, have been making increasing use of electronic control using microcomputers and other electronic circuits and electronic devices for the purpose of improvement of the fuel consumption of the internal combustion engine, automatic transmission, and other main equipment indispensable for operation (hereinafter referred to as the "main equipment"), reduction of the exhaust, smooth driving, and safe driving.

Further, experiments have been made with replacing the meters of the front panel with electronic display devices, for example, color liquid crystal display devices, to further facilitate recognition of the operating state of the vehicle and, at the same time, provide various information on the vehicle in various forms.

Further, there has been strong demand for greater improvement of the riding comfort and improvement of convenience of the vehicle as a means of transportation and, at the same time, use of the vehicle not only as a means of transportation, but also as a living space. Accordingly, in addition to the main equipment, there have been an increase in mounting of air-conditioners, position-locating and driving information devices using GPSS, automatic seat adjustment devices, power windows, wipers, door locks, various lamps, radios, CD players, TVs, entertainment equipment, and other auxiliary apparatuses and equipment (hereinafter referred to as "auxiliary equipment") and an increase in the electronic control of the same.

As described above, along with the electronic control of electrical components, main equipment, and auxiliary equipment mounted in vehicles, not only has there been an increase in the electrical components and the parts of the main equipment and auxiliary equipment per se which are electrically driven, but also various electronic devices have been mounted in the vehicles for the electronic control of the main equipment and auxiliary equipment.

Accordingly, the supply of power in the vehicle and the transmission of signals for operating the electronic control devices for these apparatuses and equipment mounted in the vehicle have become important.

In the supply of power and transmission of signals in a vehicle, however, when the power feed lines and signal lines (wire harness) are affixed by screws to the chassis or the like, the covering of the wire harness is sometimes broken resulting in contact of the inside conductor with the chassis and consequent short-circuiting. Alternatively, the wire harness may pass through the door or another swinging portion or pass through a moving portion etc. and thereby undergo fatigue and consequent disconnection or short-circuiting.

Breakage or short-circuiting of a power feed line or a signal line would cause a problem in that the main equipment or auxiliary equipment would no longer be able to normally operate. Therefore, various countermeasures have been proposed.

Japanese Unexamined Patent Publication (Kokai) No. 60-193764 discloses a technique calling for provision of a current sensor and a circuit breaker in the wire harness between a power source and load of a vehicle, detecting the unit current flowing from the power source to an electrical component or other load while the vehicle is stopped so as to detect abnormal states, and driving the circuit breaker when an abnormality is determined so as to cut off the load from the power source. Japanese Unexamined Patent Publication (Kokai) No. 60-193746 also describes that short-circuits of extents not melting the fuse can be detected. However, this method only covers abnormal states while the vehicle is stopped, so has the defect that it cannot be applied while the vehicle is being driven. Further, this method cannot pinpoint the position where the short-circuit occurs, therefore it is not possible to isolate the short-circuited portion and automatically restore the supply of power.

In one example of a vehicular use power feed apparatus of the related art, it has been proposed to connect a power feed line protected by a fuse, fusible link, or other power feed line protecting element to an electrical component for each subsystem so as to restrict the effect of a short-circuit etc. occurring in the power feed line to just that subsystem and thereby prevent other subsystems from being affected. With this technique, however, there is the problem that many power feed lines must be laid. In particular, as a practical problem, it is not easy to lay out many power feed lines in the restricted space of a vehicle.

Japanese Unexamined Patent Publication (Kokai) No. 57-80239 discloses a technique in which the power feed line is configured as a loop, a current sensor is provided at least at one position of the power feed line, an abnormal state detected by the current sensor is informed to a central control unit, the central control unit successively turns a plurality of power source control units on and off to identify (pinpoint) the position where the abnormality occurred, and the pinpointed position where the abnormality occurred is cut out of the power supply loop.

Japanese Unexamined Patent Publication (Kokai) No. 5-64361 discloses a technique in which two systems of power feed lines are laid and power is supplied via diodes so that power may be supplied from the problem-free power feed line even if the other power feed line is broken or short-circuits.

Japanese Unexamined Patent Publication (Kokai) No. 8-275408 discloses a backup system for power feed lines in which two systems of power feed lines are laid in parallel between the power source and a load and two relays for switching these two systems of power feed lines are provided. When a problem such as a short-circuit occurs in one power feed line system, the relay connects the other power feed line system and load.

In the centralized wiring apparatus for an automobile disclosed in Japanese Unexamined Patent Publication (Kokai) No. 57-80239, while the complexity of the configuration of the power feed lines is avoided, there is a problem that a long time is taken for detection of trouble and too long a time is taken for isolating the portion where the trouble occurred.

Namely, in this centralized wiring apparatus for an automobile, when an abnormality occurs, the entire system is reset once (state where no power is supplied), then restarted, therefore a state where no power is fed continues for a long time and real time backup is not possible. Further, in each power control unit, the power feed line is opened or closed at one contact, therefore there is the problem that when a portion whose function it is desired to maintain at all costs short-circuits, backup is not possible.

In the method disclosed in Japanese Unexamined Patent Publication (Kokai) No. 5-64361, since two systems of power feed lines are laid, the wire harness becomes thick. It is difficult to lay such a wire harness in a restricted space. Further, large current diodes become necessary.

In the method disclosed in Japanese Unexamined Patent Publication (Kokai) No. 8-275408, since two systems of power feed lines are laid for every group of loads switched by one relay, the wire harness becomes thick. Laying of such a thick wire harness in the restricted space of a vehicle is difficult. Particularly, since the two systems of power feed lines are provided for improvement of the reliability, desirably two such power feed lines should be separated from each other in position, but various practical problems are encountered when such a design concept is applied to the inside of a vehicle where space is so restricted.

Further, this method is almost useless against trouble such as disconnection of lines.

While the above explanation was given with respect to mainly power feed lines, similar problems to the above are encountered with signal transmission lines for transmission of control signals and the like.

As described above, there is strong demand for the effective supply of power to the electrical components, main equipment, auxiliary equipment, electronic control unit, and other loads and electronic apparatuses with a high reliability and for the establishment and maintenance of reliable signal paths in vehicles—where there are many limitations in space and practical problems in mounting.

SUMMARY OF THE INVENTION

An object of the present invention is to provide a vehicular use power feed apparatus which can quickly detect a position where trouble occurs, isolate the trouble, and continue the supply of power elsewhere.

Another object of the present invention is to provide a vehicular use power feed apparatus with a small number of power feed lines, a strong resistance to trouble, and a high reliability.

Still another object of the present invention is to provide a vehicular use power feed apparatus provided with a backup function using a small number of power feed lines and enabling the supply of power to a plurality of voltage distribution units without causing a momentary interruption in the power supply.

To attain the above objects, according to a first aspect of the present invention, there is provided a vehicular use power feed apparatus comprised of a battery and a plurality of power distribution devices connected in the form of a loop via power feed lines, power being supplied from each of the power distribution devices to an electric load mounted in the vehicle, wherein in this vehicular use power feed apparatus, each of the plurality of power distribution devices has a first switch means connected to one power feed line; a second switch means connected to another power feed line; a power feed state monitoring means for monitoring the state of power supplied through the first switch means and the second switch means; a signal transmitting means for performing the communication with an adjoining power distribution device; and a controlling means for controlling the operating states of the first and second switch means by referring to information from the signal transmitting means and information from the power feed monitoring means.

Preferably, the power feed monitoring means has a current detection element provided between the first switch means and the second switch means, a current direction detecting means for detecting the direction of the current flowing through the current detection element, and an overcurrent detecting means for detecting whether or not the current flowing through the current detection element is excessive; and the controlling means transmits the signal obtained at the overcurrent detecting means and the direction of the current detected at the current direction detecting means to the adjoining power distribution device via the signal transmitting means, receives these detection states from the adjoining power distribution device via the signal transmitting means, pinpoints a trouble point by referring to the signal obtained at the overcurrent detecting means and the direction of current detected at the current direction detecting means inside itself and the signal obtained at the overcurrent detecting means and the direction of the current detected at the current direction detecting means in the adjoining power distribution device, cooperates with the adjoining power distribution device so as to isolate the trouble point by operating one of the first switch means and the second switch means to establish a connection, and establishes a new power feed line by operating the other of the first switch means and the second switch means to establish a connection.

Further, preferably, the power feed monitoring means has a voltage detecting means provided between the first switch means and the second switch means and a voltage level detecting means for detecting is a voltage detected at the voltage detecting means is a predetermined level or less; and the controlling means transmits a low level detection signal obtained at the voltage level detecting means to an adjoining power distribution device via the signal transmitting means, receives a low level detection signal from an adjoining power distribution device via the signal transmitting means, pinpoints a trouble point by referring to the low level detection signal inside itself and the low level detection signal from the adjoining power distribution device, cooperates with the adjoining power distribution device to isolate the trouble point by operating one of the first switch means and the second switch means to establish a connection and establishes a new power feed line by operating the other of the first switch means and the second switch means to establish a connection.

According to a second aspect of the present invention, there is provided a vehicular use power feed apparatus comprised of a battery, a main power distribution device directly receiving the supply of power from the battery, at least one sub power distribution devices, power feed lines connecting power feed portions between the main power distribution device and adjoining sub power distribution devices for supplying the power from the battery, and information transmission signal lines for transmitting information between the main power distribution device and at least one sub power distribution device, power being supplied from the battery to loads connected to the sub power distribution devices via the power feed lines, wherein, in the vehicular use power feed apparatus, the main power distribution device has a controlling means, a signal transmitting means for transmitting information with the sub power distribution devices via the information transmission signal lines in cooperation with the controlling means, at least two power feed lines for feeding power from the battery to the sub power distribution devices, at least two switch means for connecting or disconnecting the at least two power feed lines, and a trouble detecting means for detecting trouble in the power feed system outside of the switch means;

a sub power distribution device has a controlling means, a signal transmitting means for transmitting information with other sub power distribution devices via the information transmission signal line in cooperation with the controlling means, a trouble detecting means for detecting trouble in a power feed line connected to its own power distribution device, and at least one switch means for breaking the supply of power to the power feed line connected to the its own power distribution; and the controlling means in the main power distribution device and the sub power distribution device control the switch means of their own power distribution devices by referring to the result of detection of the trouble detecting means in their own power distribution devices and the result of detection of trouble in the other power distribution devices received via the information transmission signal line.

Preferably, in an initial state of the vehicular use power feed apparatus, the controlling means of the main power distribution device operates the controlling means of the sub power distribution device via the signal transmitting means and the information transmission signal line to drive the switch means in the sub power distribution devices so that the main power distribution device and at least one sub power distribution device are connected via the power feed lines.

Further, preferably, when any of the trouble detecting means detects trouble, the controlling means in the main power distribution device judges the position of trouble by the transmission information from the controlling means in the sub power distribution device detecting the trouble and transmits a switch means drive signal to the controlling means of the sub power distribution device near the judged position of trouble, and the controlling means receiving the switch means drive signal controls the switch means in the sub power distribution device so as to electrically break the power feed line.

Further, preferably, the sub power distribution device has a rectifying device for providing operating power to the controlling means and the signal transmitting means from the power feed lines connected to the sub power distribution device at both sides.

Further, preferably, provision is made of at least two control use power feed lines for providing control power from the battery for driving the controlling means and the signal transmitting means; and the controlling means in the sub power distribution device and the signal transmitting means receive the drive power from the control use power feed lines via the rectifying device.

Further, preferably, a sensor for detecting shock is provided in the vehicle; and the controlling means in the main power distribution device operates the switch means in the main power distribution device to break the connection in accordance with the detection of shock by the sensor.

Further, preferably, the trouble detecting means in the main power distribution device and the trouble detecting means in the sub power distribution device contain current detecting means for detecting short-circuits of the connected power feed lines; and, at the time of a short-circuit of the power feed lines, the controlling means in the main power distribution device and the controlling means in the sub power distribution device cooperate to drive the switch means to isolate the short-circuited position and control the switching means to establish a new power feed route.

Further, preferably, the trouble detecting means in the main power distribution device and the trouble detecting means in the sub power distribution device contain voltage detecting means for detecting the disconnection of the connected power feed lines; and at the time of disconnection of the power feed lines, the controlling means in the main power distribution device and the controlling means in the sub power distribution means cooperate to control the switching means to bypass the disconnection position and establish a new power feed route.

Further, preferably, the battery and the main power distribution device are integrally constituted without a use of external wiring.

Further, preferably, the battery is a secondary battery.

Further, preferably, a semiconductor switching element is provided in each of the at least two control use power feed lines in the main power distribution device; the controlling means of the main power distribution device controls the vehicular use power feed apparatus to a first state for operating the switch means of the power feed line in the main power distribution device to break the connection in accordance with a state of use of a load recognized by the controlling means of the sub power distribution device, a second state for operating the semiconductor switching element determining an existence of the supply of power from the control power source applied to the controlling means to break the connection when the first state continues for a predetermined time, and a third state for operating the switch means and semiconductor switching element to establish a connection in the normal operation state.

Further, according to a third aspect of the present invention, provision is made of a power feed line for electrically connecting a battery and equipment mounted in a vehicle driven by the battery; a switch means provided at a predetermined position on the power feed line; a connection fault detecting means for detecting a connection fault of a section of the power feed line located between it and the adjoining switch means by an overheat detection system; and a controlling means for instructing breakage of the connection to the switch means at the two ends of a section of the power feed line in which a connection fault is detected.

Further, preferably, the connection fault detecting means has an overheat detection line disposed along the power feed line via a material melting by heat generation and held at a predetermined potential; a potential change detecting means for detecting a change of potential of the overheat detection line; and a connection fault detection unit for detecting a connection fault occurring in the power feed line based on the detected change of potential.

Further, preferably, the switch means is a relay switch circuit.

That is, in the vehicular use power feed apparatus of the third aspect of the present invention, if a short-circuit occurs at a certain position of for example the power feed line, heat is generated at that position, the material located at that position is melted, and the power feed line and the overheat detection line are short-circuited. As a result, the potential of the overheat detection line changes, the change of potential is detected at the connection fault detection unit, and existence of a connection fault in the section is detected. Then, the switch means located on the two sides of the section are switched to the circuit breaking state. By this, the section on the power feed line in which the short-circuit exists is isolated.

Further, according to a fourth aspect of the present invention, there is provided a vehicular use power feed apparatus provided with a battery; power feed lines for electrically connecting the battery and equipment mounted in the vehicle driven by the battery; switch means provided at predetermined positions on the power feed lines; an interference detection use conductive line disposed in a section between adjoining switch means near the periphery of a power feed line or via an insulation layer; an interference detecting means for monitoring a potential of the interference detection use conductive line and detecting the interference of the interference detection use conductive line with the outside based on the result of the monitoring; a current detecting means for detecting a current flowing through a power feed line; a current abnormality detecting means for detecting an abnormality in the current based on the detected current; an interference section specifying means for specifying the section in which the interference occurred in the interference detection use conductive line based on the result of detection of the interference detecting means; and a controlling means for determining a time from the detection of the abnormality in the current to when the connection is to be broken by the switch means based on the specified section and instructing the breaking of the connection to the switch means based on this determined time.

Preferably, the controlling means determines the time so that the switch means near the specified section among a plurality of the switch means breaks the connection in a shorter time from the detection of the abnormality in the current compared with that of a far switch means.

That is, in the vehicular use power feed apparatus of the fourth aspect of the present invention, when for example a short-circuit to the body occurs for example at a certain position on a power feed line, the interference detection use conductive line short-circuits with the body preceding this and the change of potential of the interference detection use conductive line is detected in the interference detecting means. The interference detecting means detects that the interference detection use conductive line interferes with the outside based on the change of potential of this interference detection use conductive line. Next, the interference section specifying means specifies the section in which the interference occurred in the interference detection use conductive line based on the result of detection of the interference detecting means. Next, the controlling means determines the time from the detection of the abnormality in the current to when the connection is to be broken by the switch means based on the specified section.

Thereafter, when the power feed line is short-circuited with the body, an abnormal current flows through the power feed line and an abnormality in the current is detected in the current abnormality detecting means based on the detected current. When an abnormality in the current is detected, the controlling means instructs the breakage of the connection to the switch means based on the determined time.

At this time, for example, the controlling means determines the time so that the switch means near the specified section among a plurality of the switch means breaks the connection in a shorter time after the detection of the abnormality in the current compared with a far switch means.

For this reason, the connection is broken at the switch means at the two ends of the power feed line on which the short-circuit occurred first. After this, no abnormality in the current is detected any longer in the other current abnormality detecting means. As a result, the connection of the power feed line is not broken by the switch means away from the power feed line on which the short-circuit occurred and therefore it is possible to isolate only the short-circuited power feed line from the group of normal power feed lines.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Embodiments of the vehicular use power feed apparatus of the present invention will be explained next referring to the attached drawings.

First Embodiment

Figure 1:
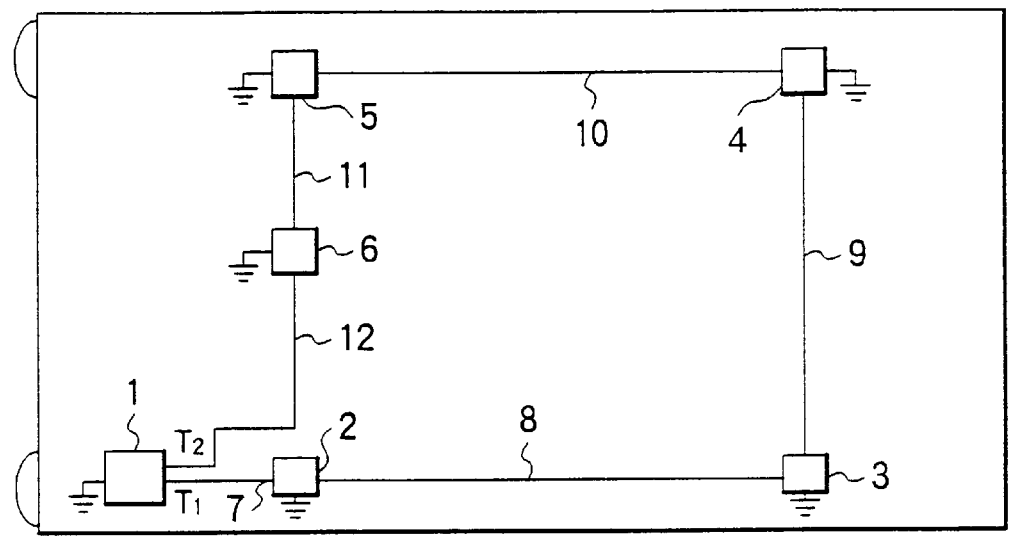
FIG. 1 is an overall view of the configuration of a vehicular use power feed apparatus according to a first embodiment of the present invention.

FIG. 1 is an overall view of the configuration of a first embodiment of the vehicular use power feed apparatus of the present invention.

In the vehicular use power feed apparatus of the present embodiment, a battery 1 and power distribution units 2, 3, 4, 5, and 6 are connected in a loop via power feed lines 7, 8, 9, 10, 11, and 12.

A main power distribution unit (not shown) directly receiving power from the battery 1 and the "sub" power distribution units 2, 3, 4, 5, and 6 are also connected in a loop via signal lines for transmission of control information together with the power feed lines, but these signal lines are not illustrated in FIG. 1 for simplicity's sake.

The battery 1 is a secondary battery mounted in the vehicle and charged from an alternator (not illustrated).

The battery 1 feeds power to the loads connected to the power distribution units 2, 3, 4, 5, and 6 shown in FIG. 1, for example, various electrical components.

In the present embodiment, the battery 1 has a first power source terminal T1 connected to a power feed line 7 leading from the battery 1 toward the power distribution unit 2 and a second power source terminal T2 connected to a power feed line 12 leading from the battery 1 toward a power distribution unit 6.

The power distribution units 2, 3, 4, 5, and 6 basically have the same configuration. The configuration of the power distribution unit 5 will be explained next as a representative example referring to FIG. 2.

The power distribution unit 5 has power feed line breaker units 13 and 14, a current monitoring unit 15, a current amount determination unit 16, a current direction determination unit 17, a control unit 18, a multiplex signal transmission unit 19, an input control unit 21, and a load control unit 22.

The power feed line breaker units 13 and 14 are connected with power feed lines 11 and 10. The power feed line 11 is connected to the power feed line breaker unit in the adjoining power distribution unit 6, while the power feed line 10 is connected to the power feed line breaker unit in the adjoining power distribution unit 4.

The multiplex signal transmission unit 19 is connected to signal multiplex transmission lines 24 and 25. The signal multiplex transmission line 24 is connected to a multiple signal transmission unit in the adjoining power distribution unit 6, while the signal multiplex transmission line 25 is connected to a multiple signal transmission unit in the adjoining power distribution unit 4.

The input control unit 21 is connected to a switch circuit 20.

The load control unit 22 is connected to loads 23.

The power feed line breaker unit 13 is connected to the power feed line 11 connected to the power distribution unit 6 and is operated in accordance with a drive signal of the control unit 18. When the power feed line breaker unit 13 is in the connection state, the current or voltage of the battery 1 from the power feed line 11 is supplied to the load control unit 22 via the current monitoring unit 15 and used for the driving of a load 23, for example, a direction indicator (blinker).

The power feed line breaker unit 14 is connected to the power feed line 10 connected to the power distribution unit 4 and is operated in accordance with a drive signal of the control unit 18. When the power feed line breaker units 13 and 14 is in the connection state, the current or voltage of the battery 1 from the power feed line 10 is supplied to the load control unit 22 and used for the driving of a load 23.

When both of the power feed line breaker units 13 and 14 are in the connection state, the power distribution units 4, 5, and 6 are connected via the power feed lines 10 and 11. In this way, the power feed line breaker units 13 and 14 are means for forming a power feed loop.

Each of the power feed line breaker units 13 and 14 is realized by a switching element (circuit) which can interrupt a DC voltage or DC current of the battery 1, for example, an electromagnetic relay (electromagnetic switch), intelligent power switch, or power MOSFET.

The current monitoring unit 15 disposed between the power feed line breaker units 13 and 14 is constituted by an ammeter or the like using a fine shunt resistance of for example about 22 m$\Omega$ and measures the supplied current flowing through the power distribution unit 5.

The current amount determination unit 16 determines whether or not the current flowing between the power feed line breaker units 13 and 14 is an overcurrent generated due to trouble such as a short-circuit.

Explaining an example of the circuit configuration of the current amount determination unit 16, this is constituted by for example amplifying the voltage across the two ends of a shunt resistor by a differential amplifier circuit, supplying the amplified voltage to a first input terminal of a comparison circuit using an operational amplifier, and supplying a comparison use reference voltage to a second input terminal. When a reference current more than that corresponding to the comparison use reference voltage flows through the shunt resistor of the current monitoring unit 15, the current amount determination unit 16 outputs a signal of a "high" level indicating that an overcurrent flowed to the control unit 18. By this, when a decision signal of a "high" level is input from the current amount determination unit 16, the control unit 18 can determine that an overcurrent flowed through the current monitoring unit 15.

The current direction determination unit 17 detects the direction of the current flowing through the current monitoring unit 15. For example, the direction of the current flowing from the power feed line 10 to the power feed line 11 is defined as positive, while the direction of the current flowing from the power feed line 11 to the power feed line 10 is defined as negative.

Explaining an example of the circuit configuration of the current direction determination unit 17, similar to the circuit of the current amount determination unit 16, this is constituted by for example amplifying the voltage across the two ends of the shunt resistor by the differential amplifier circuit, supplying the amplified voltage to the first input terminal of a comparison circuit using an operational amplifier, and supplying a positive fine comparison use reference voltage near 0V to a second input terminal as the comparison use reference voltage. When the voltage obtained by amplifying the voltage across the two ends of the shunt resistor is a voltage more than the comparison use reference voltage, the current direction determination unit 17 outputs a "high" level signal indicating the flow of a "positive" current to the control unit 18. Conversely, when the voltage obtained by amplifying the voltage across the two ends of the shunt resistor is a voltage less than the comparison use reference voltage, the current direction determination unit 17 outputs a "low" level signal indicating the flow of a "negative" current to the control unit 18. By this, the control unit 18 can determine the direction of the current flowing through the current monitoring unit 15.

The input control unit 21 receives as its input the state of switching from the switch circuit 20 such as a wiper operation switch and blinker indication switch and supplies this to the control unit 18.

The load control unit 22 controls the supply of power to the loads 23 in accordance with a control signal of the control unit 18. For example, the load control unit 22 supplies power to a blinker driving device among the loads 23 when receiving a blinker operation control signal from the control unit 18.

The multiplex signal transmission unit 19 performs communication of the control information etc. with the multiplex signal transmission units of the adjoining power distribution units 4 and 6 via the signal multiplex transmission lines 24 and 25 constituted by a twist pair or the like in cooperation with the control unit 18.

The control unit 18 includes a microcomputer etc. and controls the driving of the loads 23 via the load control unit 22 in accordance with an operation instruction signal of the switch circuit 20 input via the input control unit 21, performs various control by signals input via the multiplex signal transmission unit 19, and further performs the detection of trouble explained in detail later and the corresponding operations for the same.

Figure 2:
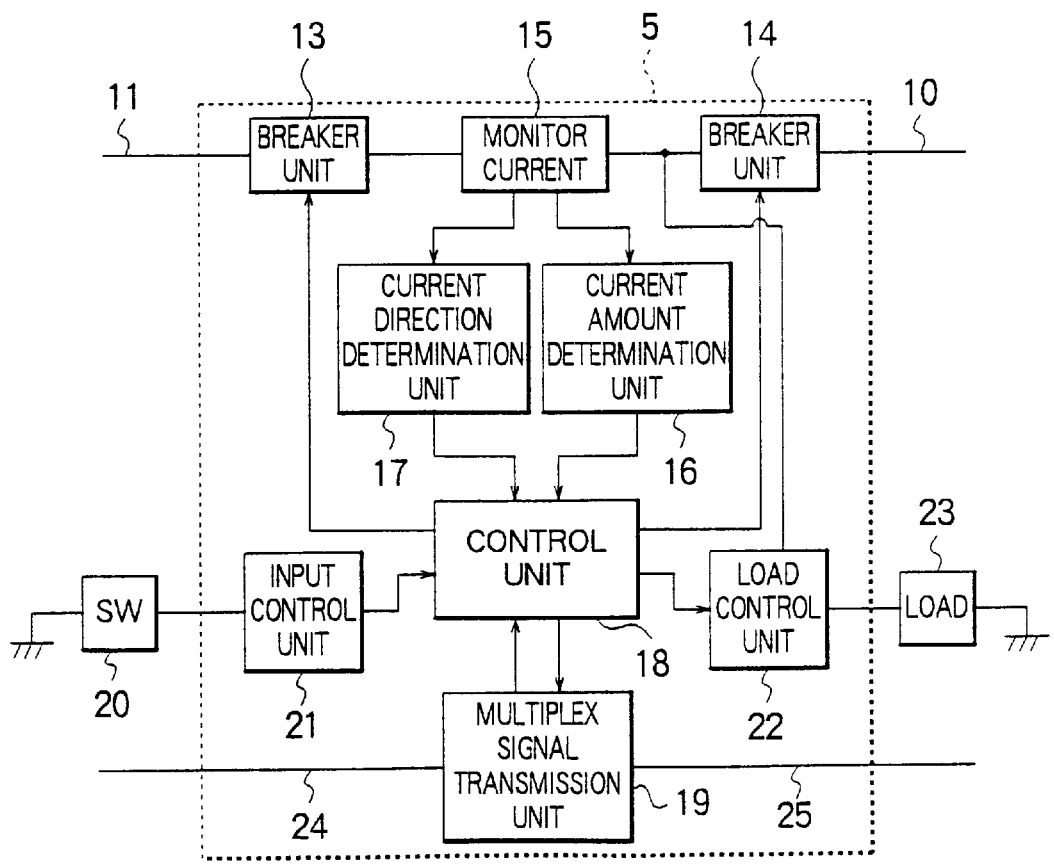
FIG. 2 shows a configuration of a power distribution unit in the vehicular use power feed apparatus shown in FIG. 1.

In FIG. 1 and FIG. 2, the power sources for operating the comparison circuit of the current amount determination unit 16, the comparison circuit of the current direction determination unit 17, the control unit 18 including the microcomputer, the input control 21, the load control unit 22, and the load control unit 22 are not illustrated. There are various types of power sources for operating these circuits in the power distribution unit 5. For example, as the power source for driving the control circuits, the power is fed directly from the battery 1 by using a power line (not illustrated) different from the power feed lines 10 and 11. Since power is always supplied between the power feed line breaker units 13 and 14, voltage is drawn from between the power feed line breaker units 13 and 14 and fed to these circuits. Alternatively, a DC battery may be provided in the power distribution unit 5 and power fed from this.

Below, the operation of the vehicular use power feed apparatus shown in FIG. 1 will be explained referring to the power distribution unit 5.

Initial State to Normal State

When the ignition key is inserted, the vehicle is initialized and an initialization signal is transmitted to the multiplex signal transmission units of the power distribution units 2, 3, 4, 5, and 6 via the signal multiplex transmission lines. The control units of the power distribution units 2, 3, 4, 5, and 6 then perform the control processing. Below, this will be explained using the control unit 18 of the power distribution unit 5 as a representative case.

When receiving the initialization signal, the control unit 18 of the power distribution unit 5 sets the power feed line breaker units 13 and 14 to the connection state.

The control units in the other power distribution units 2, 3, 4, and 6 similarly set the two power feed line breaker units to the connection state.

Here, however, the control unit of a certain power distribution unit, for example, the power distribution unit 6, keeps the power feed line breaker unit connected to the power feed line 12 in the nonconnection state as it is (opened as it is). As explained above, the battery 1 has the first power source terminal T1 connected to the power feed line 7 from the battery 1 to the power distribution unit 2 and the second power source terminal T2 connected to the power feed line 12 from the battery 1 to the power distribution unit 6.

As the method of supplying power, there can be considered: (1) the method of setting two power feed line breaker units (two power feed line breaker units 13 and 14 in the power distribution unit 5) of all power distribution units in the connection state so that the power is fed from the first terminal T1 and the second terminal T2 of the battery 1 to all power distribution units; (2) the method of setting one power feed line means circuit of either of the closest (terminal) power distribution unit 2 or power distribution unit 6 seen from the battery 1 in the nonconnection state so as to form a loop configuration through a plurality of power distribution units from the first terminal T1 of the battery 1; and (3) the method of setting any power distribution unit in the loop configuration, for example, one power distribution unit of the power distribution unit 4, in the nonconnection state to establish two power feed systems to the power distribution units 2-3-4 from the first terminal T1 of the battery 1 and the power distribution units 6-5-4 from the second terminal T2 of the battery 1. Below, in the present embodiment, the case where the power is fed by the second method will be explained.

The following power feed line is established by the above process.

A power feed line of the counterclockwise direction of "the first terminal T1 of the battery 1—the power feed line 7—the power distribution unit 2—the power feed line 8—the power distribution unit 3—the power feed line 9—the power distribution unit 4—the power feed line 10—the power distribution unit 5—the power feed line 11—the power distribution unit 6".

As a result, it becomes possible to supply power from the battery 1 to the loads of each of the power distribution units 2, 3, 4, 5, and 6.

Occurrence of Trouble: Short-Circuit

Figure 3:
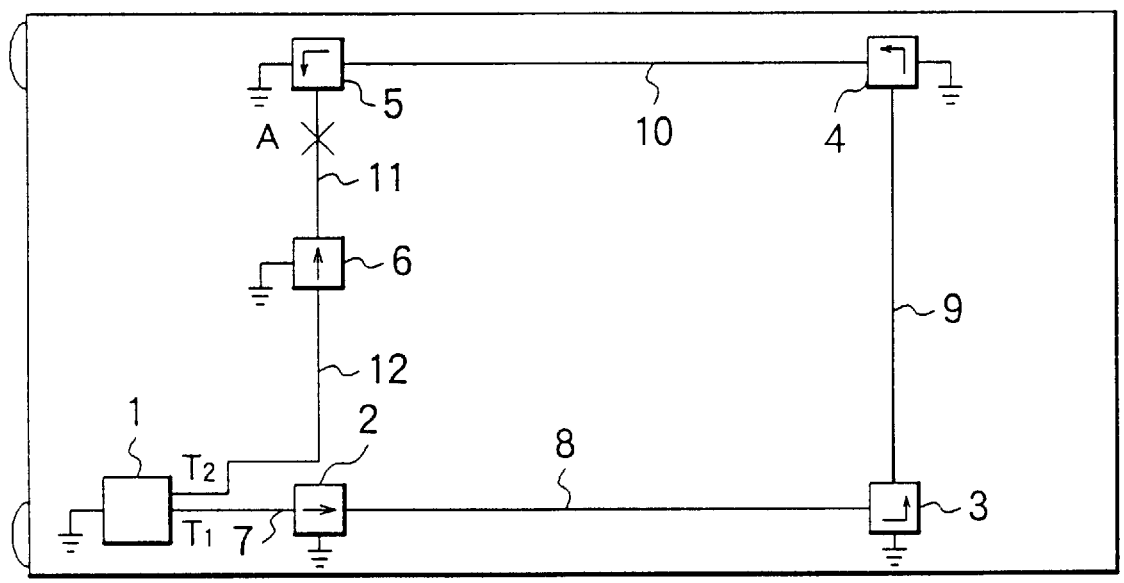
FIG. 3 is a view illustrating the detection of occurrence of trouble and its restoration in the vehicular use power feed apparatus shown in FIG. 1.

For example, as illustrated in FIG. 3, when the conductor of the power feed line is short-circuited with the chassis in the power feed line 11 between the power distribution unit 5 and the power distribution unit 6, a large current flows from the battery 1 to the trouble point X via the power feed line.

In this case, the current amount determination units of the power distribution units 2, 3, 4, and 5 (the current amount determination unit 16 in the power distribution unit 5) detect an overcurrent and inform this to the control unit (control unit 18 in the power distribution unit 5). The direction of the current direction determination units of the power distribution units 2, 3, 4, and 5 (the current direction determination unit 17 in the power distribution unit 5) at this time is "positive". However, the power is no longer fed to the power distribution unit 6, so the direction of the current direction determination unit in the power distribution unit 6 (corresponding to the current direction determination unit 17 of the power distribution unit 5) changes from "positive" to "negative". Accordingly, the control unit in the power distribution unit 6 detects an occurrence of trouble at the position before the power feed line 11. Therefore, the control unit of the power distribution unit 6 informs the occurrence of trouble to the adjoining power distribution unit 5 via the multiplex signal transmission unit and the signal multiplex transmission line. Conversely, also in the power distribution unit 5, the occurrence of trouble is informed to the power distribution units 4 and 6 on both sides via the multiplex signal transmission unit 19 when the current amount determination unit 16 detects an overcurrent.

In the loop configuration, the control unit of the power distribution unit 4 in the forward direction of the power distribution unit 5 does nothing since the result of determination of its own current amount determination unit is in the same state as that of the rearward power distribution unit 5.

The control unit 18 of the power distribution unit 5 detects that a short-circuit occurred in the power feed line 11 toward the rearward power distribution unit 6. Similarly, the control unit of the power distribution unit 6 detects that the short-circuit occurred in the power feed line 11 toward the forward power distribution unit 5. The control unit 18 of the power distribution unit 5 and the control unit of the power distribution unit 6 confirm that a short-circuit occurred between the two power distribution units via the multiplex signal transmission unit.

Restoration Operation

The control unit 18 in the power distribution unit 5 sets the power feed line breaker unit 13 connected to the power feed line 11 to the nonconnection state to stop the supply of power to the trouble point X. Further, the control unit of the power distribution unit 6 sets the power feed line breaker unit connected to the power feed line 11 (corresponding to the power feed line breaker unit 14 in the power distribution unit 5) to the nonconnection state and sets the power feed line breaker unit connected to the power feed line 12 (corresponding to the power feed line breaker unit 13 in the power distribution unit 5) to the connection state.

As a result, as illustrated in FIG. 3, by setting the power feed line breaker unit 13 connected to the power feed line 11 in the power distribution unit 5 to the nonconnection state and setting the power feed line breaker unit connected to the power feed line 11 in the power distribution unit 6 to the nonconnection state, the trouble point X is isolated from the loop configuration. Further, by setting the power feed line breaker unit connected to the power feed line 12 in the power distribution unit 6 to the connection state, the power distribution unit 6 is supplied with power from the second terminal T2 of the battery 1.

By this, the power distribution unit 6 becomes able to operate similar to that before the occurrence of trouble. Of course, outputs of the current amount determination units 16 in the power distribution units 2, 3, 4, and 5 become normal due to the isolation of the trouble point X, therefore also the power distribution units 2, 3, 4, and 5 return to their normal operation.

The power feed system at this time becomes as follows as illustrated in FIG. 3.

(1) A power feed line of a counterclockwise direction of "the first terminal T1 of battery 1—the power feed line 7—the power distribution unit 2—the power feed line 8—the power distribution unit 3—the power feed line 9—the power distribution unit 4—the power feed line 10—the power distribution unit 5".

(2) A power feed line of a clockwise direction of "the second terminal T2 of battery 1—the power feed line 12—the power distribution unit 6".

As explained above, since the overcurrent is detected by the current amount determination units (16) inside the power distribution units 2, 3, 4, 5, and 6 and since the direction of the current is detected by the current amount determination unit 16, it is possible to exchange information with the adjoining power distribution units via the signal multiplex transmission line and the multiplex signal transmission unit 19, determine an occurrence of trouble such as a short-circuit, and further determine an occurrence of trouble during a change of the direction of flow of current.

When the trouble point X is specified, the power distribution units 5, 6 on the two sides of the trouble point X isolate the trouble point X, and the power distribution unit 6 after the trouble point X drives the power feed line breaker unit so that the power is fed from the battery 1 by a reverse system.

The above example shows an example where a short-circuit trouble occurred in the power feed line 11, but when a short-circuit trouble occurs in the power feed line 10, the power distribution unit 4 and the power distribution unit 5 detect the occurrence of the short-circuit trouble in the power feed line 10. Therefore, the power distribution unit 5 informs the occurrence of trouble in the forward position to the later power distribution unit 6.

Thereafter, the power distribution unit 4 stops the supply of power to the power feed line 10 connected to the trouble point X, the power distribution unit 5 sets the power feed line breaker unit 14 connected to the power feed line 10 to the nonconnection state to isolate the trouble point X, while the power distribution unit 5 holds the power feed line breaker unit 13 connected to the power feed line 11 in the connection state. The power distribution unit 6 sets the power feed line breaker unit connected to the power feed line 12 in the nonconnection state to the connection state.

As a result, the following power feed systems are established:

(1) A power feed line of a counterclockwise direction of "the first terminal T1 of the battery 1—the power feed line 7—the power distribution unit 2—the power feed line 8—the power distribution unit 3—the power feed line 9—the power distribution unit 4".

(2) A power feed line of a clockwise direction of "the second terminal T2 of the battery 1—the power feed line 12—the power distribution unit 6—the power feed line 11—the power distribution unit 5".

The above example of a loop configuration exemplified a case where the loop configuration was formed in the counterclockwise direction, but the case where the loop is constituted in the clockwise direction from the battery 1 is similar to the above description.

Further, the example of the loop configuration shows a loop configuration terminated at the power distribution unit 6, but a case where the power feed systems of two sides are established as will be described later can be adopted as a normal state.

(1) A power feed line of a counterclockwise direction of "the first terminal T1 of the battery 1—the power feed line 7—the power distribution unit 2—the power feed line 8—the power distribution unit 3—the power feed line 9—the power distribution unit 4".

(2) A power feed line of a clockwise direction of "the second terminal T2 of the battery 1—the power feed line 12—the power distribution unit 6—the power feed line 11—the power distribution unit 5".

In such a case, for example, where the trouble point X occurs in the power feed line 11, the power distribution unit 6 detects the occurrence of the trouble point X in the power feed line 11 and informs this to the power distribution unit 5. The power distribution unit 5 informs the power distribution unit 4 to supply power to the power feed line 10 to which the power is not fed at present.

The power distribution unit 6 sets the power feed line breaker unit connected to the power feed line 11 to the connection state, while the power distribution unit 5 sets the power feed line breaker units 13 and 14 connected to the power feed line 11 to the connection states to isolate the trouble point X. The power distribution unit 4 sets the power feed line breaker unit connected to the power feed line 10 to the nonconnection state.

From above, the following loop configurations are established:

(1') A power feed line of a counterclockwise direction of "the first terminal T1 of the battery 1—the power feed line 7—the power distribution unit 2—the power feed line 8—the power distribution unit 3—the power feed line 9—the power distribution unit 4—the power feed line 10—the power distribution unit 5".

(2') A power feed line of a clockwise direction of "the second terminal T2 of battery 1—the power feed line 12—the power distribution unit 6".

Second Embodiment

Explaining the power distribution unit 5 as a representative case, the above embodiment referred to an example where the power distribution unit 5 judged the occurrence of trouble and the position thereof by detecting the overcurrent and the direction of the current, but the above configuration is not enough for the detection of a disconnection. For the detection of a disconnection, a voltage monitoring unit for monitoring the voltage of the power feed line becomes necessary. Accordingly, when disconnection is also to be detected, the voltage monitoring unit is provided together with the current monitoring unit 15 and the control unit 18 performs the processing after the detection of disconnection.

After the detection of disconnection by the voltage monitoring unit, the judgement of the trouble point by the control unit 18, the isolation thereof, and the establishment of new power feed line are performed similar to the case of a short-circuit trouble explained above.

Third Embodiment

In the third embodiment, both of the countermeasure against short-circuits explained in the first embodiment and the countermeasure against disconnection explained in the second embodiment are provided.

The present invention is not restricted to the above embodiments. Various modifications can be made to them as well.

For example, as the current monitoring unit 15 and current direction determination unit 17 in the power distribution unit 5 shown in FIG. 2, it is possible to use not a shunt resistor method, but a current meter using for example a Hall effect element so as to detect the direction of current and the amount of electric power. The control unit 18 performs the processing of the current amount determination unit 16 by judging the amount of electric power per unit.

An example where the multiplex signal transmission unit 19 exchanged information with adjoining power distribution units 4 and 6 via a signal multiplex transmission line was shown, but it is sufficient that information be exchanged with the adjoining power distribution units 4 and 6, i.e., there is no need for multiplexing. However, a signal multiplex transmission is used in order to lay (arrange) the transmission lines inside a vehicle where space is so restricted.

As the method of supplying power in the normal state explained above, an explanation was given of an operation in the case where the power feed system of the second method was used among the three exemplified methods, but the present invention can be applied to also the loop configuration, two power feed systems, or any other power feed system state.

As explained above, according to the present invention, a trouble point can be quickly and correctly detected. Further, according to the present invention, as the trouble, trouble such as a short-circuit and disconnection can be detected. Further, according to the present invention, it is possible to isolate only the trouble point and establish a new power feed line. As a result, the power is subsequently supplied from the power distribution unit to the load.

Fourth Embodiment

A fourth embodiment of the vehicular use power feed apparatus of the present invention will be explained next by referring to the attached drawings.

FIG. 4 to FIG. 7 are views of the configuration of the fourth embodiment of the vehicular use power feed apparatus of the present invention and explanatory views of its operation.

Figure 4:
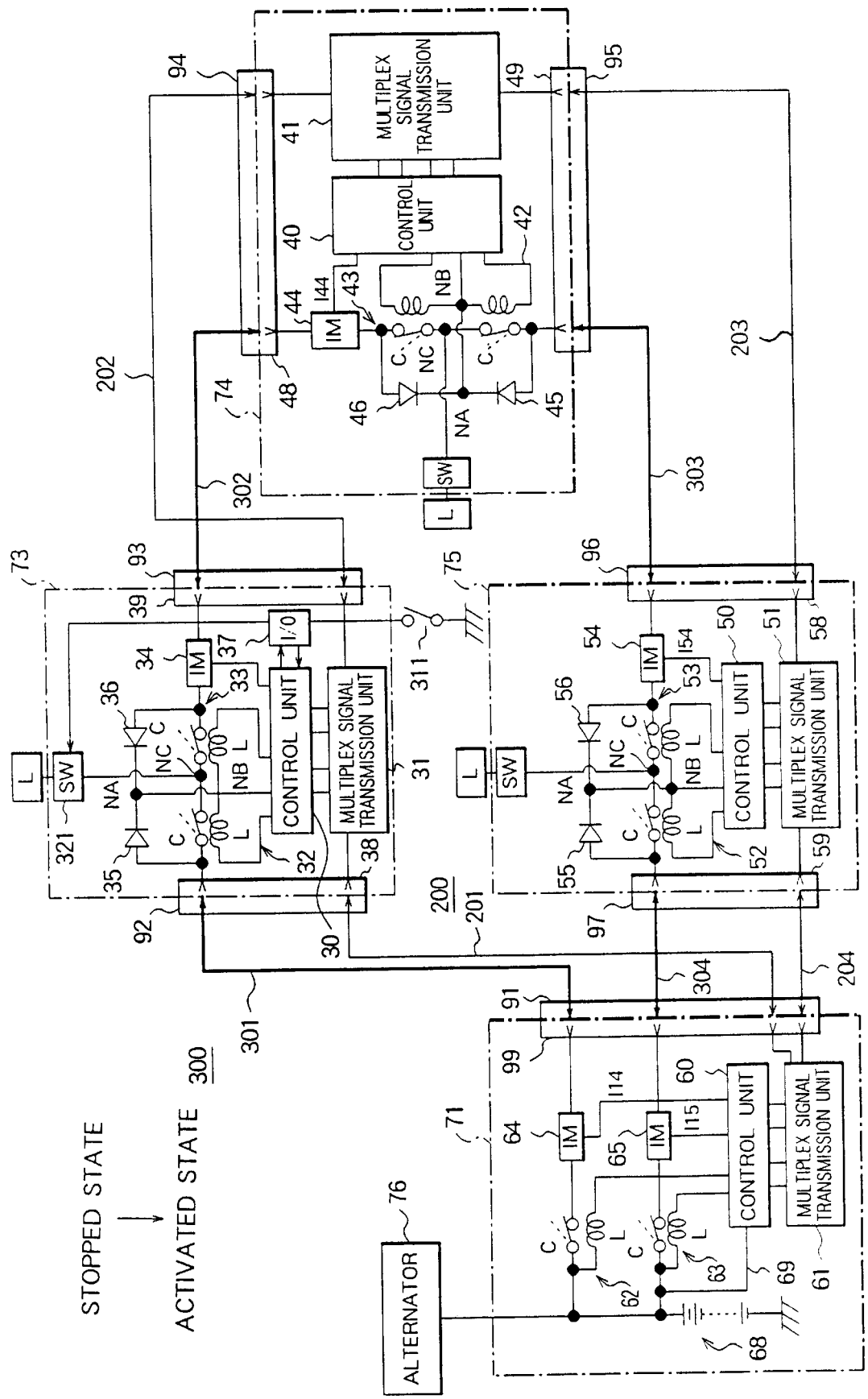
FIG. 4 is a view of the configuration of a vehicular use power feed apparatus according to a fourth embodiment of the present invention showing, in particular, the state when the vehicle is stopped.

As illustrated in FIG. 4, in the vehicular use power feed apparatus of the present embodiment, one main power distribution unit 71 and three sub power distribution units 73, 74, and 75 are connected to power feed lines 301 to 304 indicated by bold lines by using the signal multiplex transmission lines 201 to 204 indicated by the thin lines, respectively.

The power feed lines 301 to 304 connected to the main power distribution unit 71 and the sub power distribution units 73 to 75 will also be referred to as "the power feed line 300". Similarly, the signal multiplex transmission lines 201 to 204 connected to the main power distribution unit 71 and the sub power distribution units 73 to 75 will also be referred to as "the signal line 200". As described above, in the present embodiment, the power feed lines 301 to 304 constitute substantially a single power feed line. Similarly, the signal multiplex transmission lines 201 to 204 constitute substantially a single signal line.

While the detailed connection configuration will be explained later, in the present embodiment, it should be noted that there are in effect two possible power feed systems at the main power distribution unit 71. In both the normal state and in an abnormal state such as occurrence of trouble, a relay switch circuit of one of the sub power distribution units 73, 74, and 75 is in the nonconnection state, that is, neither the power feed line 300 nor the signal line 200 constitute closed loop configurations. By adopting such a configuration, the judgement of a position of trouble, explained later, becomes easy.

Various configurations of the vehicular use power feed apparatus of the present invention can be adopted. As such a configuration, for example, (1) it is possible to adopt a loop configuration consisting of the relay switch circuit 62 of the main power distribution unit 71, the sub power distribution units 73, 74, and 75, and the relay switch circuit 63 of the main power distribution unit 71 or (2) it is also possible to form two power feed systems consisting of the relay switch circuit 62 of the main power distribution unit 71, the sub power distribution units 73, the relay switch circuits 63 of and the main power distribution unit 71, and the sub power distribution units 75 and 74.

Below, the present embodiment will explained with reference to a case of adopting the illustrated loop configuration.

An example of arrangement of the main power distribution unit 71 and sub power distribution units 73, 74, and 75 will be explained first.

The main power distribution unit 71 is disposed in for example an engine compartment of the vehicle, the sub power distribution unit 73 is disposed at the right side of the instrument panel, the sub power distribution unit 75 is disposed at the left of the instrument panel, and the central sub power distribution unit 74 is disposed at rear the furthest from the main power distribution unit 71.

Accordingly, the power feed line 301 and signal line 201 are laid (arranged) from the main power distribution unit 71 of the engine compartment to the sub power distribution unit 73 located at the right side of the instrument panel, the power feed line 304 and signal line 204 are laid from the main power distribution unit 71 of the engine compartment to the sub power distribution unit 75 located at the left side of the instrument panel, the power feed line 302 and the signal line 202 are laid from the sub power distribution unit 73 located at the right side of the instrument panel to the sub power distribution unit 74 located at the rear, and the power feed line 303 and the signal line 203 are laid from the sub power distribution unit 75 located at the left side of the instrument panel to the sub power distribution unit 74 located at the rear.

Connector plugs 91 and 92 are connected to the two ends of the power feed line 301 and the signal line 201. By just engaging a receptacle 99 attached to the main power distribution unit 71 and a receptacle 38 attached to the sub power distribution unit 73 with these plugs, the power feed line and signal line between the main power distribution unit 71 and the sub power distribution unit 73 are easily established. Below, similarly, establishment of the power feed line and signal line between the sub power distribution unit 73 and the sub power distribution unit 74, establishment of the power feed line and signal line between the sub power distribution unit 74 and the sub power distribution unit 75, and establishment of the power feed line and signal line between the sub power distribution unit 75 and the main power distribution unit 71 can be easily achieved by just engaging the plug of each with the corresponding receptacle.

The internal configuration of the main power distribution unit 71 will be explained next.

The main power distribution unit 71 has a secondary battery 68, a control unit 60 including a microcomputer, a multiplex signal transmission unit 61, an input/output (I/O) unit (not illustrated), relay switch circuits 62 and 63 each comprising a coil L and a contact C and disposed in parallel, and current monitoring units 64 and 65 for monitoring the current flowing from the secondary battery 68 to the outside.

The illustration of the signal input unit was omitted for simplifying the figure, but this signal input unit is connected to the control unit 60 in the same way as the signal input unit 37 in the sub power distribution unit 73. The control unit 60 actually drives the relay switch circuits 62 and 63 via the signal input unit. Further, for example, a signal from the not illustrated ignition key switch is read by the control unit 60 via the signal input unit. However, in the illustrated, main power distribution unit 71, the relay switch circuits 62 and 63 are shown as being driven directly from the control unit 60 for simplification of the drawing. This is true also in the sub power distribution units 73 to 75.

The battery 68 is connected to the alternator 76 and can be charged from the alternator 76.

Each of the current monitoring unit 64 and the current monitoring unit 65 can adopt a circuit configuration using a current detector equipped with a shunt resistor, amplifying the voltage across the shunt resistor by a differential amplifier, and comparing the amplified voltage with a reference voltage value at a comparison circuit using an operational amplifier. Further, it is also possible to use a noncontact type current detector such as a Hall effect element for the current monitoring unit 64 and current monitoring unit 65.

The current monitoring unit 64 detects existence of trouble such as a short-circuit in the power feed line 301 between the main power distribution unit 71 and the sub power distribution unit 73. When trouble occurs, the control unit 60 reads the trouble detection signal of the current monitoring unit 64, sets the relay switch circuit 62 to the nonconnection state, and thereby stops the supply of power feed the battery 68 to the outside.

Similarly, the current monitoring unit 65 detects existence of trouble such as a short-circuit in the power feed line 304 between the main power distribution unit 71 and the sub power distribution unit 75. Where trouble occurs, the control unit 60 reads the trouble detection signal of the current monitoring unit 65, sets the relay switch circuit 62 to the nonconnection state, and thereby stops the supply of power from the battery 68 to the outside.

The control unit 60 includes a microcomputer which performs signal transmission processing explained later in cooperation with the multiplex signal transmission unit 61 and in addition drives the relay switch circuit 62 and relay switch circuit 63 to form the loop of the power feed line 300 and signal line 200. Further, the control unit 60 reads the detected values of the current monitoring units 64 and 65 to monitor the power feed line 300. The detailed control operations will be explained later.

Note that it can be also considered not to include the battery 68 in the main power distribution unit 71, but to dispose it outside of the main power distribution unit 71 in the same way as the alternator 6.

The sub power distribution units 73, 74, and 75 basically have the same configurations as that of the main power distribution unit. Note that an example where the current monitoring unit 44 is provided inside the sub power distribution unit 74 located at the center is shown, but the current monitoring unit 44 is not always necessary for the detection of trouble as will be explained later. However, in the following example, it is assumed that the current monitoring unit 44 exists.

The configuration and operation of the sub power distribution unit 73 will be explained as a representative example.

The sub power distribution unit 73 has a control unit 30, a multiplex signal transmission unit 31, relay switch circuits 32 and 33 each comprising a coil L and contact C and connected in series, one current monitoring unit 34, two rectification diodes 35 and 36, and an input/output unit (signal input unit) 37.

The two rectification diodes 35 and 36 are connected in reverse directions straddling a node NA therebetween.

The contacts C of the relay switch circuit 32 and relay switch circuit 33 are connected in series while straddling a node NC therebetween. A load L is connected to this node NC through a switching element 321. Since the sub power distribution unit 73 is disposed at the right of the instrument panel, the load L constitutes a headlight, door driving electrical component, etc. near the right side of the instrument panel.

The coils L of the relay switch circuit 32 and relay switch circuit 33 are connected in series while straddling a node NB therebetween.

The control unit 30 includes a microcomputer which performs signal transmission processing explained later in cooperation with the multiplex signal transmission unit 31 and in addition drives the relay switch circuit 32 and relay switch circuit 33 to form the loops of the power feed line 300 and signal line 200. The control unit 30 reads the detected value of the current monitoring unit 34 to monitor the power feed line 300. The detailed control operations will be explained later.

In accordance with the opening and closing operation of the switching element 321, the voltage or current of the battery 68 from the main power distribution unit 71 at the node NC of the sub power distribution unit 73 is supplied to the load L. The opening and closing operation of the switching element 321 is carried out by the control unit 30 via the signal input unit 37. Note, for simplification of illustration, the driving lines of the signal input unit and switching element were omitted in the other sub power distribution units 74 and 75.

As also mentioned in the explanation of the main power distribution unit 71, the relay switch circuit 32 and the relay switch circuit 33 are set to the connection state or nonconnection state in accordance with a command of the control unit 30 via the signal input unit 37, but are illustrated as if they were controlled directly from the control unit 30 for simplification of the drawing. The same is true for the other sub power distribution units 74 and 75.

For example, signals of the ignition key switch, power window operation switch, etc. are input to the control unit 30 via the signal input unit 37 in the case of the switch 311 shown as a representative case. Again, the other power distribution units 74 and 75 may also have switch input units, but these are omitted from the illustration for simplification of the drawing.

Figure 5:
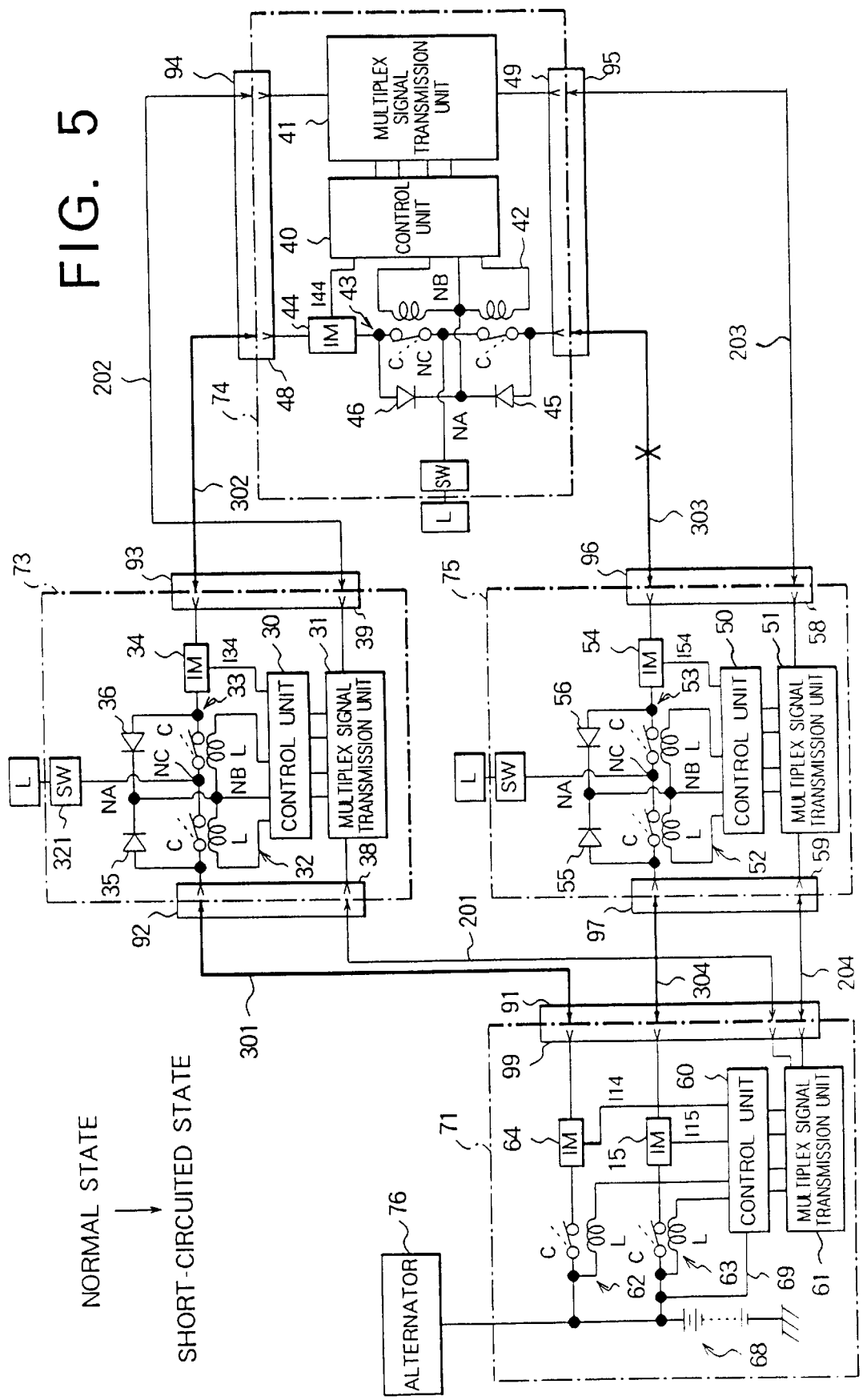
FIG. 5 is a view of the configuration of the vehicular use power feed apparatus according to the fourth embodiment of the present invention showing, in particular, the state where a short-circuit occurs from the normal state of the vehicle.

Further, the signal input unit, the switching element for energizing and deenergizing the load L, and the switching input are not essential parts of the present invention, so are not illustrated in FIG. 5 and subsequent drawings.

The current monitoring unit 34 detects the existence of trouble such as a short-circuit downstream of it in the power feed line 302 between the sub power distribution units 73 and 74. When trouble occurs, the relay switch circuit 33 is set to the nonconnection state to stop the supply of power from the battery 68 and thereby isolate the trouble.

Note that the meaning of the term "downstream" in the present invention changes according to the loop configuration of the vehicular use power feed apparatus. For example, when the sub power distribution unit 73 is supplied with power directly from the main power distribution unit 71, the power feed line 302 becomes "downstream", while conversely, when the sub power distribution unit 73 is supplied with power from the sub power distribution unit 74 side, the power feed line 301 becomes "downstream". Namely, the term "downstream" means the downstream direction of the flow of current.

In the configuration illustrated in FIG. 4, the current monitoring unit 64 in the main power distribution unit 71 is used for the detection of trouble between the main power distribution unit 71 and the sub power distribution unit 73 and the region downstream thereof. The current monitoring unit 65 is used for the detection of trouble between the main power distribution unit 71 and the sub power distribution unit 75 and the region downstream thereof.

Similarly, the current monitoring unit 34 in the sub power distribution unit 73 is used for the detection of trouble between the sub power distribution unit 73 and the sub power distribution unit 74 and the region downstream thereof.

Further, the current monitoring unit 54 in the sub power distribution unit 75 is used for the detection of trouble between the sub power distribution unit 75 and the sub power distribution unit 74 and the region downstream thereof.

Accordingly, as explained above, the current monitoring unit 44 in the sub power distribution unit 74 may be eliminated.

Below, the state of establishment of the route of the power feed line 300 and signal line 200 of the vehicular use power feed apparatus will be explained.

Stopped State of Vehicle (Not Operating)

In the stopped (nonoperating) state of the vehicle, in the main power distribution unit 71, the power is supplied from the battery 68 via the power feed line 69 thus enabling the control unit 60 to operate. However, in this state, the control unit 60 does nothing. The microcomputer, memory, etc. in the control unit 60 are in a sleep mode and in the minimum power consumption state. In this stopped state, the multiplex signal transmission unit 61 also does not operate. The control unit 60 deenergizes the coil L of the relay switch circuit 62 and the coil L of the relay switch circuit 63 (state indicated by a broken line of FIG. 4). Therefore, the contact C of the relay switch circuit 62 and the contact C of the relay switch circuit 63 are in the open state as illustrated, and no power is supplied to the sub power distribution units 73 and 74 and 75 from the battery 68 via the main power distribution unit 71.

In this way, in the stopped state, the control unit 60 only waits on stand-by with the minimum electric power. Power is not supplied to the sub power distribution units 73, 74, and 75 and the loads L connected there, therefore the power consumption of the battery 68 is maintained at the lowest level.

Note that the battery 68 and the main power distribution unit 71 can be integrally constituted. For example, the battery 68 may be included in the main power distribution unit 71, and the power directly fed from the battery 68 to the control unit 60 via a bus or the like. When a main power distribution unit 71 is constituted including a battery in this way, the possibility of occurrence of trouble in the power feed system to the battery 68 and the main power distribution unit 71 is greatly reduced and, usually, there is an advantage in mounting in that the arrangement of the power feed lines in the engine compartment of the vehicle in which the battery 68 is to be disposed becomes easy.

Startup State

When the ignition key switch (not illustrated) instructing the starting of the vehicle is turned on, the control unit 60 detects this state via a wire (not illustrated) directly laid from the ignition key switch to the main power distribution unit 71, coils L of the relay switch circuit 62 and the relay switch circuit 63 are energized, and the contacts C are positioned as indicated by the solid lines. As a result, the route of the battery 68, the contact C of the relay switch circuit 62, and the current monitoring unit 64 is established and power is supplied to the sub power distribution unit 73 via the power feed line 301. Similarly, the route of the battery 68, the contact C of the relay switch circuit 63, and the current monitoring unit 65 is established and power is supplied to the sub power distribution unit 75 via the power feed line 304.

Note that no circuit is provided for disconnecting the route in the signal line 200, therefore the signal line 200 of the multiplex signal transmission unit 61, the signal line 201, and the multiplex signal transmission unit 31 is always established and never disconnected.

By the supply of power to the sub power distribution unit 73, the voltage of the battery 68 is supplied to the control unit 30 through the rectification diode 35 of the sub power distribution unit 73 and therefore the control unit 30 is able to operate.

Similarly, by the supply of power to the sub power distribution unit 75, the voltage of the battery 68 is supplied to the control unit 40 through the rectification diode 55 of the sub power distribution unit 75 and therefore the control unit 40 is able to operate.

At this time, an "ignition key-operated state" signal is sent from the multiplex signal transmission unit 61 to the multiplex signal transmission unit 31. The control unit 30 reads the signal and enables the supply of power to the loads which can be driven in this state, for example, the radio or other load L. Namely, the control unit 30 energizes the coil L of the relay switch circuit 32 to set the contact C of the relay switch circuit 32 to the connection state as indicated by the solid line. As a result, potential is generated at the node NC, and the supply of power to the load L becomes possible.

Similarly, the "ignition key-operated state" signal is sent from the multiplex signal transmission unit 61 to the multiplex signal transmission unit 51. The control unit 50 reads the signal and enables the supply of power to the radio or other load L which can be driven in this state. Namely, the control unit 50 energizes the coil L of the relay switch circuit 52 to set the contact C to the connection state as indicated by the solid line. As a result, a potential is generated at the node NC, and the supply of power to the load L becomes possible.

As described above, the supply of power to only a load L which should operate in the "ignition key-operated state" is enabled and therefore the power consumption of the battery 68 is suppressed.

Normal State

As explained above, when the ignition key switch is turned to start the engine, the control unit 60 of the main power distribution unit 71 detects that state and sends a signal of that state to the multiplex signal transmission units 31 and 51 of the sub power distribution units 73 and 75 via the multiplex signal transmission unit 61.

Below, this startup state and normal state will be explained by referring to FIG. 5. The vehicular use power feed apparatus of FIG. 5 is the same in configuration etc. as the vehicular use power feed apparatus illustrated in FIG. 4 except for the positional relationship of the contact C.

The control unit 30 of the sub power distribution unit 73 energizes the coil L of the relay switch circuit 33 to set the contact C from the state indicated by the broken line to the connection state as indicated by the solid line. As a result, the route containing the contact C of the relay switch circuit 32, the contact C of the relay switch circuit 33, and the current monitoring unit 34 is established and power is supplied from the battery 68 to the sub power distribution unit 74 via the sub power distribution unit 73. Further, the "startup state" signal is transmitted from the multiplex signal transmission unit 31 to the multiplex signal transmission unit 41 of the sub power distribution unit 74.

Similarly, the control unit 50 of the sub power distribution unit 75 biases the coil L of the relay switch circuit 53 to set the contact C from the state indicated by the broken line to the connection state as indicated by the solid line. As a result, the route containing the contact C of the relay switch circuit 52, the contact C of the relay switch circuit 53, and the current monitoring unit 54 is established and power is supplied from the battery 68 to the sub power distribution unit 74 via the sub power distribution unit 75. Further, the "startup state" signal is transmitted from the multiplex signal transmission unit 51 to the multiplex signal transmission unit 41 of the sub power distribution unit 74.

In the sub power distribution unit 74, the power is supplied from the battery 68 to the control unit 40 via the current monitoring unit 44, the rectification diode 46, and the node NA and the rectification diode 46 and node N. The control unit 40 thereby operates and reads the "startup state" signal sent to the multiplex signal transmission unit 41.

In this example, the "startup state" signal is transmitted from both of the multiplex signal transmission unit 31 and the multiplex signal transmission unit 51 to the multiplex signal transmission unit 41, so the same signals collide. The sub power distribution unit at which the same signals collide is also the sub power distribution unit of the terminal end. Even in a case where not three sub power distribution units 73, 74, and 75 as in the illustrated example, but a larger number of sub power distribution units are disposed, it is possible to detect that a control unit in them is located at the terminal end of the route when the same information collides.

In the example illustrated in FIG. 5, the control unit 40 of the sub power distribution unit 74 at the terminal end energizes the coil L of either of the relay switch circuits 43 and 42, i.e., in this example, the relay switch circuit 42, to set the contact C from the state indicated by the broken line to the connection state indicated by the solid line. By this, the supply of power from the node NC to the load L becomes possible.

Note that the relay switch circuit 43 is kept in the nonconnection state as it is and its contact C is in the opened state (nonconnection state). The reason for this is that by separating the power feed route into a clockwise direction power feed route going from the current monitoring unit 64 of the main power distribution unit 71 through the sub power distribution unit 73 and a counterclockwise direction power feed route going from the current monitoring unit 65 of the main power distribution unit 71 through the sub power distribution unit 75, the position of trouble can be easily judged when trouble occurs. In this sense, as explained above, the power feed line 300 contains an opened portion and does not form a closed loop configuration.

However, as explained above, in the vehicular use power feed apparatus of the present invention, various power feed systems can be adopted.

The power feed line 300 is established by the above. Not only the supply of power to the control units 30, 40, and 50 of the sub power distribution units 73, 74 and 75, but also the supply of power to the load L from each device become possible.

Further, the signal line 200 containing the multiplex signal transmission units 61, 31, 41, and 51 is substantially established by the above.

Judgement of Occurrence of Trouble (Short-Circuit) and Trouble Point

Assume that a short-circuit occurs from the above normal state at the point X between the sub power distribution units 74 and 75 shown in FIG. 5 for a certain reason.

A large short-circuit current flows through the trouble point X due to the short-circuit. As a result, the current monitoring unit 54 in the sub power distribution unit 75 detects an overcurrent. Along with this, the current monitoring unit 64 in the main power distribution unit 71 detects an overcurrent. However, the current monitoring unit 34 in the sub power distribution unit 73 shows a normal current value.

In the sub power distribution unit 74, power is no longer normally supplied from the diode 45, but power continues to be supplied from the route of the diode 46 to the control unit 40 and the multiplex signal transmission unit 41.

Note that the control unit 50 in the sub power distribution unit 75 through which the overcurrent flows is constituted so as not to be broken by an overcurrent. Similarly, a means for preventing the overcurrent from flowing to the load L of the sub power distribution unit 75, for example, an overcurrent restriction element, is provided.

The overcurrent detected at the current monitoring unit 54 is read at the control unit 50 and informed to the multiplex signal transmission unit 61 of the main power distribution unit 71 and the control unit 60 via the multiplex signal transmission unit 51. The control unit 60 also reads the value of the overcurrent detected from the current monitoring unit 64. The reading of the current monitoring unit 34 indicating the normal detected value is informed to the control unit 60 through the control unit 30, the multiplex signal transmission unit 31, and the multiplex signal transmission unit 61.

Due to the above situation, the control unit 60 deduces the existence of the trouble point X between the sub power distribution unit 75 and the sub power distribution unit 74.

Isolation of Position of Trouble

The control unit 60 sends a signal via the multiplex signal transmission unit 61 to the control unit 50 instructing it to set the relay switch circuit 53 to the nonconnection state. Further, the control unit 60 sends a signal via the multiplex signal transmission unit 61 to the sub power distribution unit 73 instructing it to set the relay switch circuit 32 to the nonconnection state and to set the relay switch circuit 33 to the connection state.

The control unit 50 sets the relay switch circuit 53 to the nonconnection state. The control unit 40 sets the relay switch circuit 32 to the nonconnection state and sets the relay switch circuit 33 to the connection state.

Figure 6:
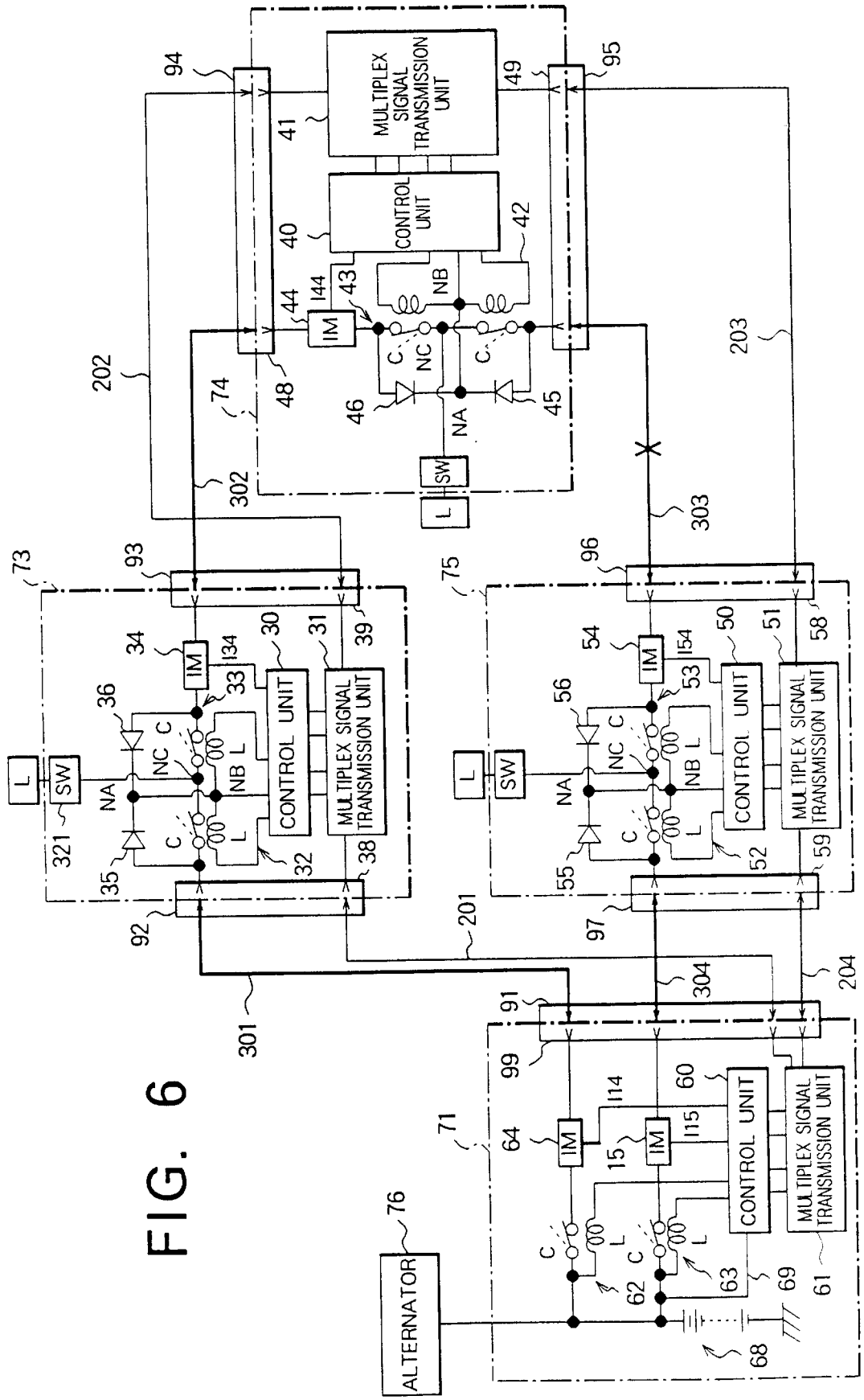
FIG. 6 is a view of the configuration of the vehicular use power feed apparatus according to the fourth embodiment of the present invention showing, in particular, the state of processing for isolating the trouble point X.

The result thereof is shown in FIG. 6. As illustrated, the trouble point X is isolated, and the supply of power to the load L of the sub power distribution unit 74 is continued via the contact C of the relay switch circuit 43 on the current monitoring unit 44 side.

As described above, according to the present embodiment, the determination (judgement) of the trouble point X and the isolation of the trouble point X are quickly and automatically carried out.

The control unit 60 stores information on the trouble point X. By outputting the stored information to for example a liquid crystal display unit of the instrument panel, it becomes possible to quickly replace the power feed line 303 including the trouble point and restore the supply of power.

Restoration Work

Usually, the power feed line 303 including the trouble point X is replaced in the stopped state of the vehicle. Therefore, after it is replaced with the normal power feed line 303, the control processings for the "stopped state", "initial state", and "startup state" explained above are repeated. If the trouble point X has been isolated at that point of time, the normal power feed line 300 is established again.

When the trouble point X has not been isolated even at that point of time, the control processing becomes the state of FIG. 6.

When the trouble point X occurs between the sub power distribution unit 73 and the sub power distribution unit 74 as well, the trouble point X is detected and isolated in the same way as that described above.

Figure 7:
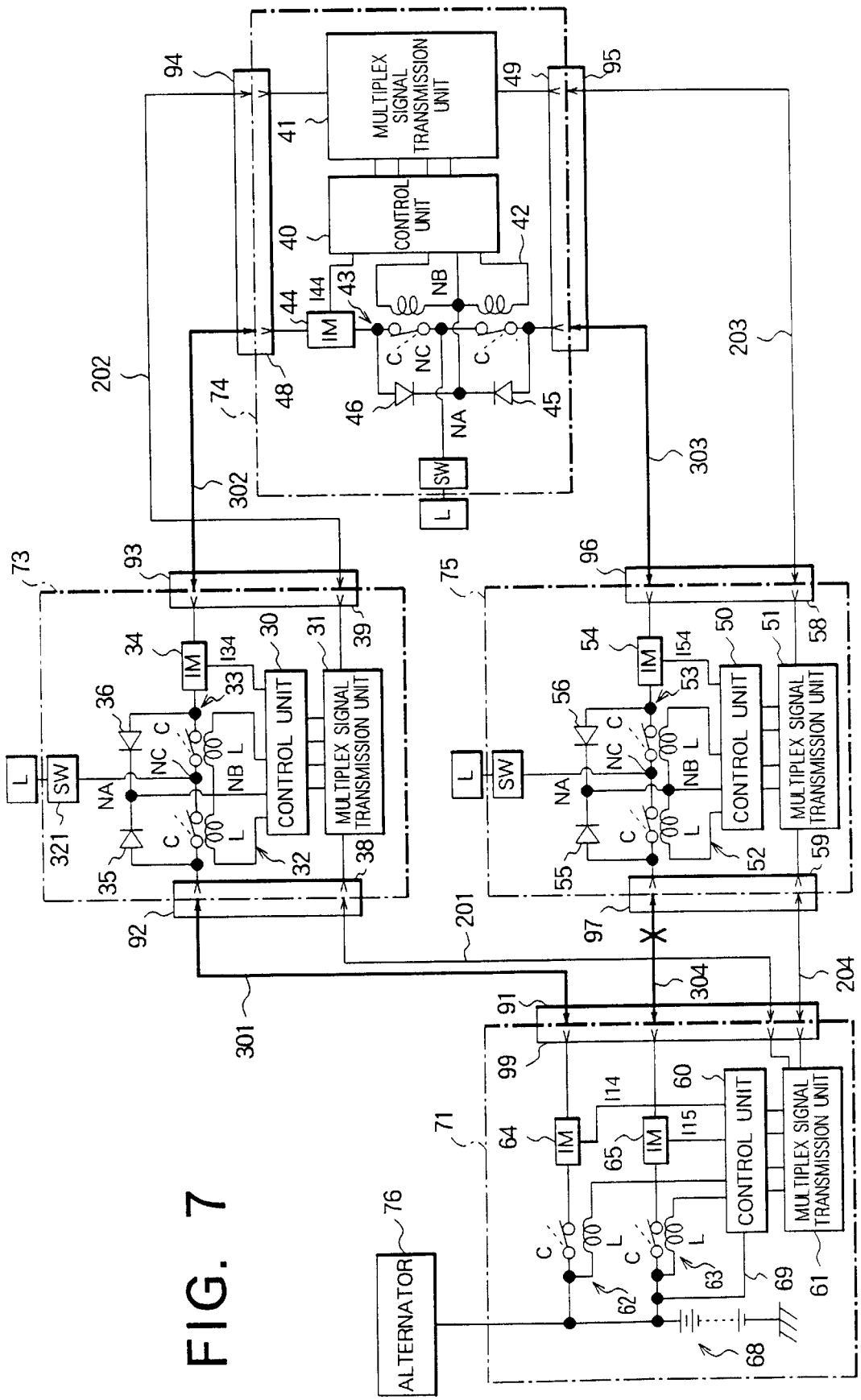
FIG. 7 is a view of the configuration of the vehicular use power feed apparatus according to the fourth embodiment of the present invention showing, in particular, the state of processing for restoration of a trouble point.

As illustrated in FIG. 7, when the trouble point X occurs in the power feed line 304 between the main power distribution unit 71 and the sub power distribution unit 75, trouble is not detected at the control units of the other power distribution units, therefore the control unit 60 of the main power distribution unit 71 detects that the overcurrent flowed through the current monitoring unit 65 and can judge (deduce) the trouble point X.

In this case, the control unit 60 changes the route illustrated in FIG. 5 to the state illustrated in FIG. 7. Namely, it sets the relay switch circuit 63 to the nonconnection state, sends a signal to the control unit 40 of the sub power distribution unit 74 through the signal line 200 instructing it to set the relay switch circuit 43 to the connection state, and sends a signal to the control unit 50 instructing it to set the relay switch circuit 52 to the nonconnection state. When the control unit 40 energizes the coil L of the relay switch circuit 43 to set the contact C to the connection state, the contact C of the relay switch circuit 63 is set to the nonconnection state and route of supply of power to the sub power distribution unit 75 is lost, but the supply of power by the route of the sub power distribution units 73-74-75 becomes possible.

Further, by switching the contact C to the nonconnection state along with the deenergizing of the coil L of the relay switch circuit 43, the trouble point X is isolated.

As explained above, in the present embodiment, if trouble occurs at one position, no matter where that trouble occurs, the trouble point can be correctly and quickly judged and quickly isolated and a new power feed line 300 established. Accordingly, the vehicular use power feed apparatus of the present embodiment keeps the adverse effect of trouble to the minimum and enables power to be continuously supplied even after occurrence of trouble. Therefore, it is high in reliability.

In addition, in the present embodiment, a single "power feed line 300" and "signal line 200" are provided, therefore a large space is not occupied when laying lines in the restricted space of a vehicle.

Modification of Fourth Embodiment: Detection of Disconnection

Above, the case where the current monitoring units 64 and 65, the current monitoring unit 34, etc. were provided in the main power distribution unit 71 and the sub power distribution units 73, 74, and 75 was exemplified. While the current monitoring unit 34 is for example effective for the detection of a short-circuit, it is not adequate for the detection of a disconnection. A voltage monitoring unit for monitoring the voltage is preferred for the detection of disconnection. Accordingly, when also detecting disconnection, desirably a voltage monitoring unit is provided together with the current monitoring unit 34.

The isolation of the trouble point and establishment of a new power feed line after the voltage monitoring unit detects disconnection are similar to the case of the short-circuit explained above.

When giving priority to the detection of a disconnection rather than the detection of a short-circuit, a voltage monitoring unit may be provided in place of the current monitoring unit 34.

Note that, when a disconnection occurs, the supply of power near the temporarily disconnected portion, for example, the sub power distribution unit 730, is stopped. In order to avoid a temporary cessation of operation of the control unit 30 and the multiplex signal transmission unit 31, it is also possible to provide a secondary power feed line to the control unit 30, multiplex signal transmission unit 31, etc. separate from the power feed line 300 to the load L. Desirably, the current monitoring means for detecting the short-circuit is provided in this secondary power feed line. As such a current monitoring means, a semiconductor switch equipped with current monitoring function etc. is known.

Fifth Embodiment

Figure 8:
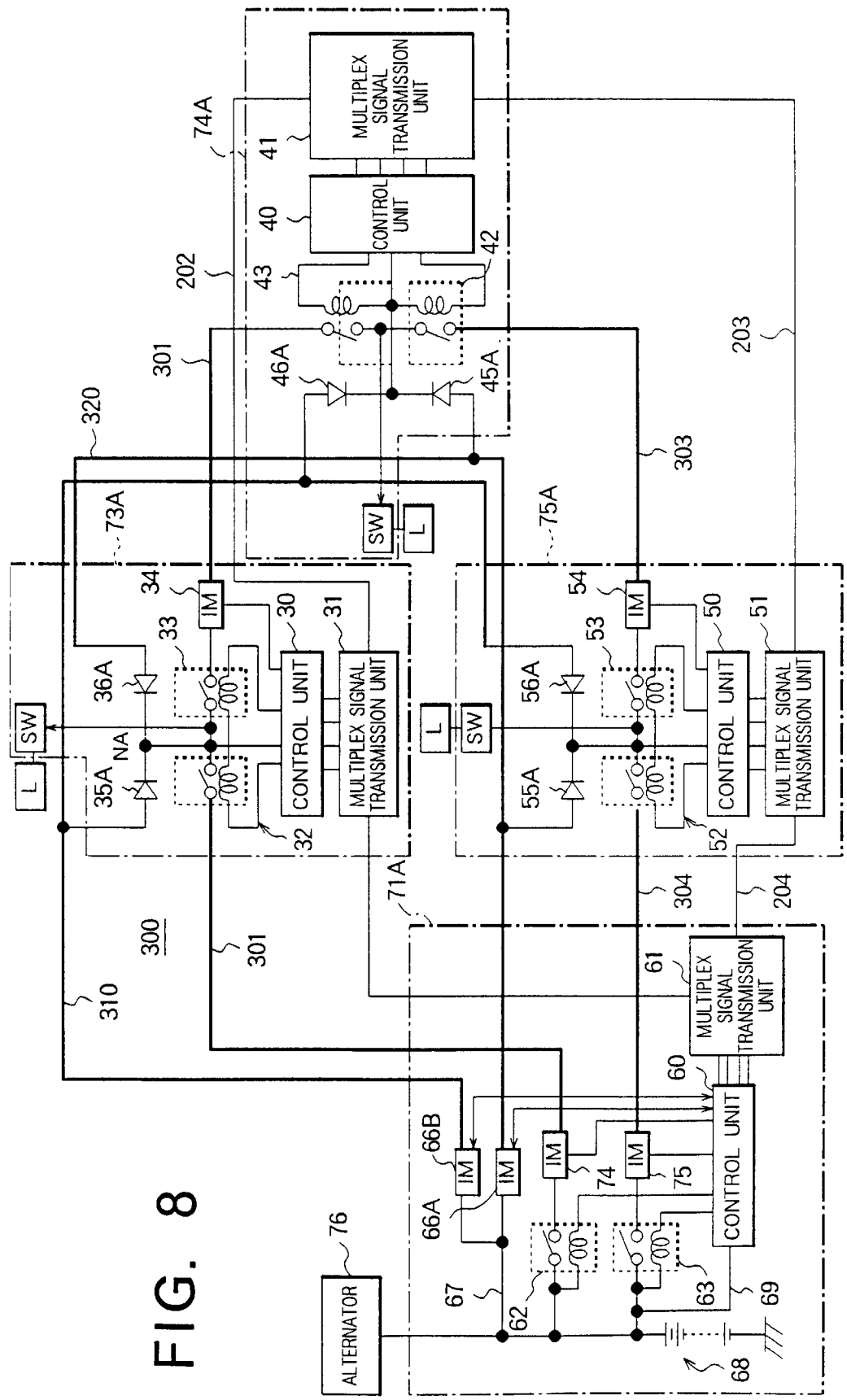
FIG. 8 is a view of the configuration of a vehicular use power feed apparatus according to a fifth embodiment of the present invention.

FIG. 8 is a view of the configuration of the vehicular use power feed apparatus of a fifth embodiment of the present invention.

The vehicular use power feed apparatus illustrated in FIG. 8 has a main power distribution unit 71A and sub power distribution units 73A, 74A, and 75A and resembles the vehicular use power feed apparatus of the fourth embodiment explained by referring to FIG. 4 to FIG. 7. Below, the difference between the vehicular use power feed apparatus of FIG. 8 and the vehicular use power feed apparatus illustrated in FIG. 4 to FIG. 7 will be explained. Note that, for simplification of illustration, in FIG. 8, the receptacles and plugs are omitted, but the configuration is similar to that of FIG. 4 to FIG. 7.

In FIG. 8, in addition to the power feed line 300, a power feed line 310 and a power feed line 320 are added.

In the main power distribution unit 71A, as compared with the main power distribution unit 71 shown in FIG. 4 to FIG. 7, a power feed line 67 is added from the battery 68. Also, current monitoring units 66A and 66B for monitoring the current of this power feed line 67 are added. The current monitoring units 66A and 66B are current meters equipped with shunt resistors or semiconductor elements with current monitoring functions similar to the current monitoring units 64 and 65.

The sub power distribution units 73A, 74A, and 75A have the same configurations except no current monitoring unit is provided in the sub power distribution unit 74A. For example, when comparing the sub power distribution unit 73A with the sub power distribution unit 73 illustrated in FIG. 4 to FIG. 7, the former is different from the latter in the point that the other ends of the rectification diodes 35A and 36A connected across the node NA with inverse polarities are directly connected to the power feed line 310 and the power feed line 320.

As apparent from the difference in configuration, the vehicular use power feed apparatus illustrated in FIG. 8 is designed so that power is always supplied to the control unit 30 and multiplex signal transmission unit 31 in the sub power distribution unit 73A, the control unit 40 and multiplex signal transmission unit 41 in the sub power distribution unit 74A, and the control unit 50 and multiplex signal transmission unit 51 in the sub power distribution unit 75A from the battery 68 not via switching elements such as the relay switch circuits 62 and 63 and the relay switch circuits 32 and 33. Namely, power is supplied to the control unit 30 and other electronic devices independently from the power feed line to the loads L, therefore the system is not affected by trouble of the power feed line 300.

In addition, for example, the rectification diodes 35A and 36A in the sub power distribution unit 73A are connected to different power feed lines 310 and 320, therefore, for example, even if trouble such as disconnection occurs in one power feed line 310, the power is supplied from the other power feed line 320. In this sense, the reliability to the power feed system to the control unit 30, multiplex signal transmission unit 31, etc. is raised.

The control operation when the vehicle is in a stopped state, the control operation in the initial state, the control operation in the startup state, the control operation in the normal state, the method of judging a short-circuit trouble point, the method of isolation of the trouble point, the method of restoration, etc. in the fifth embodiment are substantially the same as those in the fourth embodiment explained by reference to FIG. 4 to FIG. 7. In the fifth embodiment illustrated in FIG. 8, however, power is constantly supplied to the control unit 30, multiplex signal transmission unit 31, etc., therefore there is the advantage such that the time for restoration of the system from occurrence of trouble can be shortened.

Modification of Fifth Embodiment: Detection of Disconnection

The vehicular use power feed apparatus illustrated in FIG. 8 has a similar circuit configuration with respect to short-circuits as that of the vehicular use power feed apparatus illustrated in FIG. 4 to FIG. 7.

The vehicular use power feed apparatus illustrated in FIG. 8 preferably is provided with a voltage monitoring unit for monitoring the voltage for the detection of disconnection as in the modification of the fourth embodiment described above.

Sixth Embodiment

Figure 9:
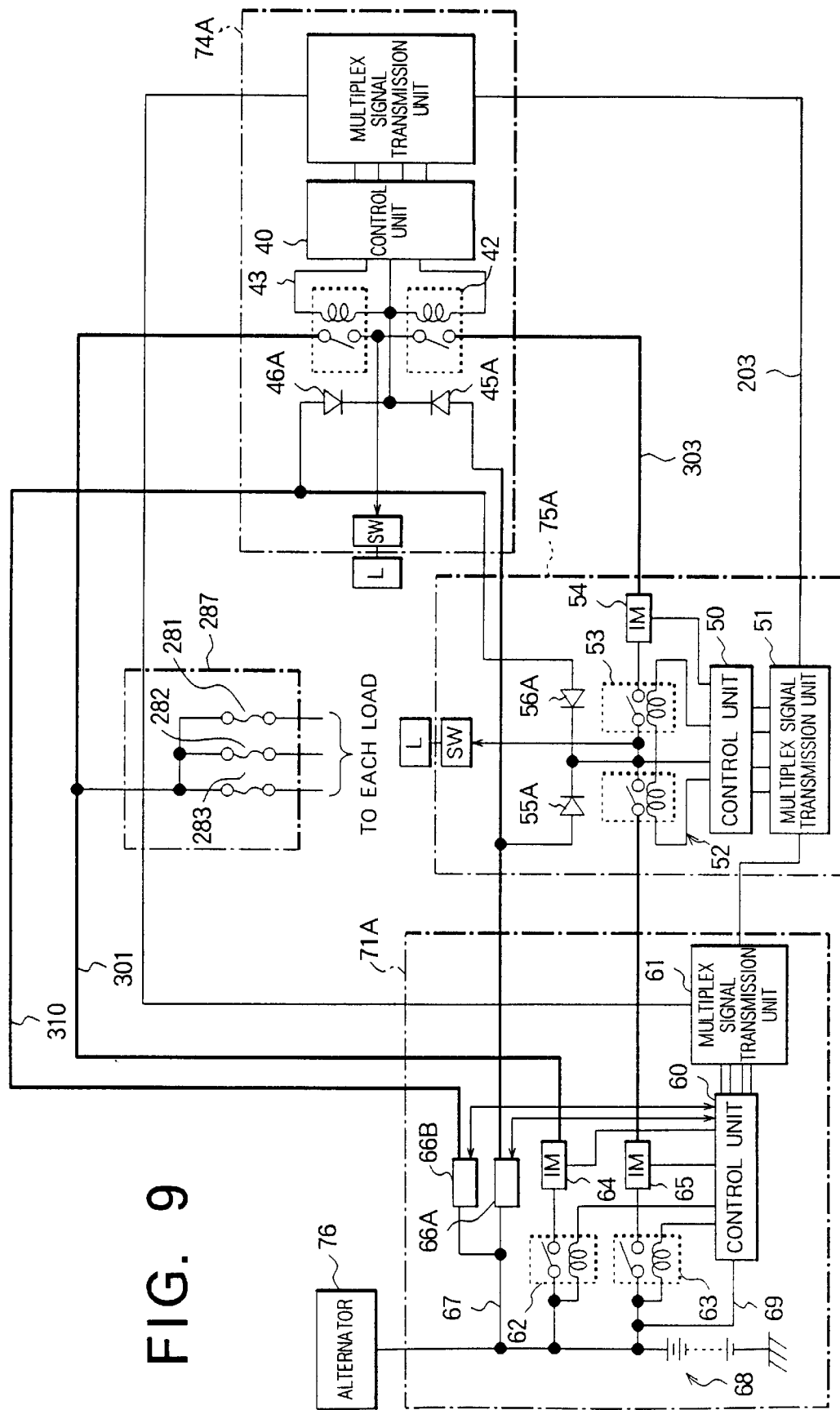
FIG. 9 is a view of the configuration of a vehicular use power feed apparatus according to a sixth embodiment of the present invention.

FIG. 9 is a view of the configuration of a vehicular use power feed apparatus of a sixth embodiment of the present invention.

The vehicular use power feed apparatus illustrated in FIG. 9 is a circuit obtained by modifying the sub power distribution unit 73A in the vehicular use power feed apparatus illustrated in FIG. 8 to only a load connection circuit 287 not having a route intercepting means such as the relay switch circuit 32 and relay switch circuit 33.

The load connection circuit 287 is provided with fuses 281 to 283 as overcurrent sensing elements. The load L is connected in the front of these fuses 281 to 283. Namely, there are three fuses 281 to 283 in the load connection circuit 287. Power is thereby distributed inside the load connection circuit 287.

Loads L are connected to the power feed line 301, therefore when the relay switch circuit 62 in the main power distribution unit 71A is set to the connection state, the power is fed to these loads L. When an overcurrent flows on the load L side, the fuse 281 etc. is blown to prevent any further overcurrent from flowing through the load L.

The rest of the configuration is similar to the vehicular use power feed apparatus illustrated in FIG. 8.

Seventh Embodiment

Figure 10:
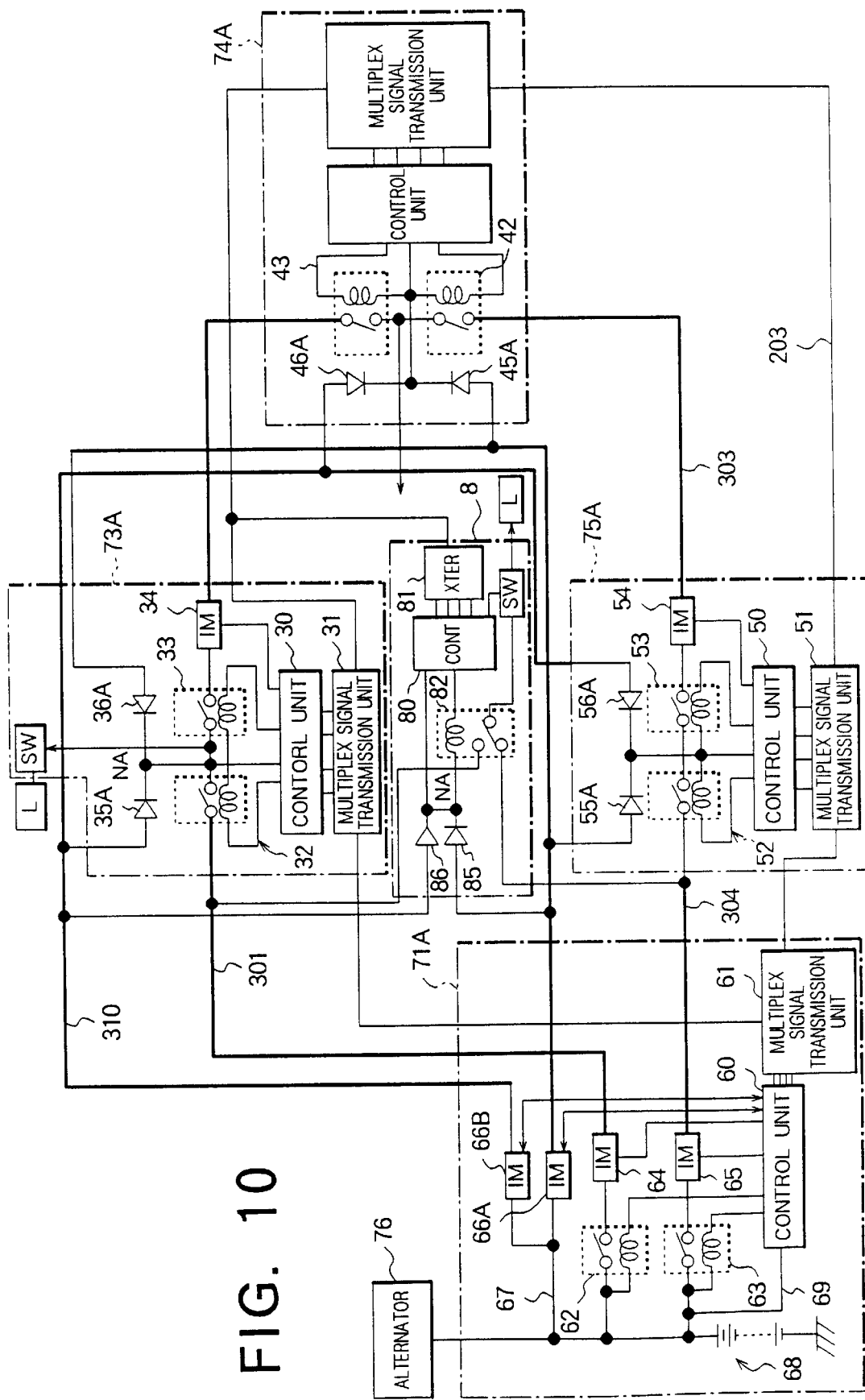
FIG. 10 is a view of the configuration of a vehicular use power feed apparatus according to a seventh embodiment of the present invention.

FIG. 10 is a view of the configuration of the vehicular use power feed apparatus of a seventh embodiment of the present invention.

The vehicular use power feed apparatus illustrated in FIG. 10 is a circuit obtained by adding the sub power distribution unit 8 to the vehicular use power feed apparatus illustrated in FIG. 8.

The sub power distribution unit 8 has a control unit 80, multiplex signal transmission unit 81, relay switch circuit 82, and rectification diodes 85 and 86 connected with inverse polarities.

The rectification diode 85 is connected to the power feed line 320, while the rectification diode 86 is connected to the power feed line 310. The connection node NA of the rectification diodes 85 and 86 is connected to the control unit 80, therefore the power is directly fed to the control unit 80 and the multiplex signal transmission unit 81 from the battery 68 without being influenced by the operation of the switching elements of the relay switch circuits 62 and 13.

One terminal of the coil L of the relay switch circuit 82 is supplied with power similar to the control unit 80.

One of the contacts C of the relay switch circuit 82 is connected to the power feed line 301, while the other is connected to the power feed line 304. The common contact of the contacts C is connected to the load L. Namely, by the state of the contacts C of the relay switch circuit 82 which is set to the connection state or nonconnection state by the control unit 80, the load L connected to the output terminal of the relay switch circuit 82 is supplied with power from the power feed line 301 or supplied with power from the power feed line 304. In other words, the power feed line of the load L is selectively switched in accordance with the operation of the relay switch circuit 82.

The rest of the configuration is similar to that of the vehicular use power feed apparatus illustrated in FIG. 8.

Eighth Embodiment

The vehicular use power feed apparatuses illustrated in FIG. 4 to FIG. 9 showed examples of apparatuses mounted in a vehicle.

Vehicles may be involved in various types of accidents, for example, collisions and crashes. In such a case, short-circuits and the like may occur and further the control unit 60, control unit 30, etc. may stop functioning making proper operation of the embodiments explained above difficult. In such a case, there is a possibility that not only the detection of the trouble point X causing the short-circuit, but also the isolation of the trouble point X will become difficult. If only the supply of power from the battery 68 is continued in such a situation, there is a possibility of occurrence of various secondary problems.

In order to deal with such a situation, as the eighth embodiment of the present invention, it is also possible to add an acceleration sensor for detecting a shock applied to the main power distribution units 71 and 71A in a collision or crash and a shock breaker means for stopping all of the supply of power from the battery 68 at the main power distribution unit 71 (71A) when the acceleration sensor senses a shock so as to prevent the occurrence of secondary problems due to short-circuits even if short-circuits occur.

Note that it is also possible to provide the acceleration sensor for detecting shock in a collision, crash, etc. of a vehicle at the outside of the main power distribution units 71 and 71A and transmit the detection signal of the acceleration sensor to the main power distribution units 71 and 71A by wiring.

The present invention is not restricted to the above embodiments either. Various other modifications can be adopted as well.

For example, in the above embodiments, an example in which the battery 68 was contained in the main power distribution unit 71 and integrally constituted was shown. If the battery 68 is contained in the main power distribution unit 71 in this way, there is the advantage that wiring not protected by a housing or the like between the battery 68 and the main power distribution unit 71 can be shortened or such writing can be eliminated.

A highly reliable system for the supply of power to the electrical components, main equipment, auxiliary equipment, etc. mounted in a vehicle was mainly explained above, but the above vehicular use power feed apparatus is not limited to use to a vehicle and can be applied for various other purposes requiring a highly reliable power supply system.

Further, while the above embodiments explained a case where the DC current and voltage were supplied from the battery 68, the present invention is not limited to the supply of direct current and DC voltage from the battery 68 and can be applied to also to the supply of alternating current and AC power. Note that here however the detection circuit such as the current monitoring unit 64 is changed to an AC one, while the relay switch circuits 62 and 63 and other switching elements are changed from relays to triacs and other AC switching elements.

As explained above, according to the present invention, the number of the power feed lines can be minimized, even to one.

Further, according to the present invention, a vehicular use power feed apparatus having a high reliability against trouble such as short-circuits and disconnection can be realized.

Further, according to the present invention, power can be supplied to the loads in various forms.

Ninth Embodiment

Figure 11:
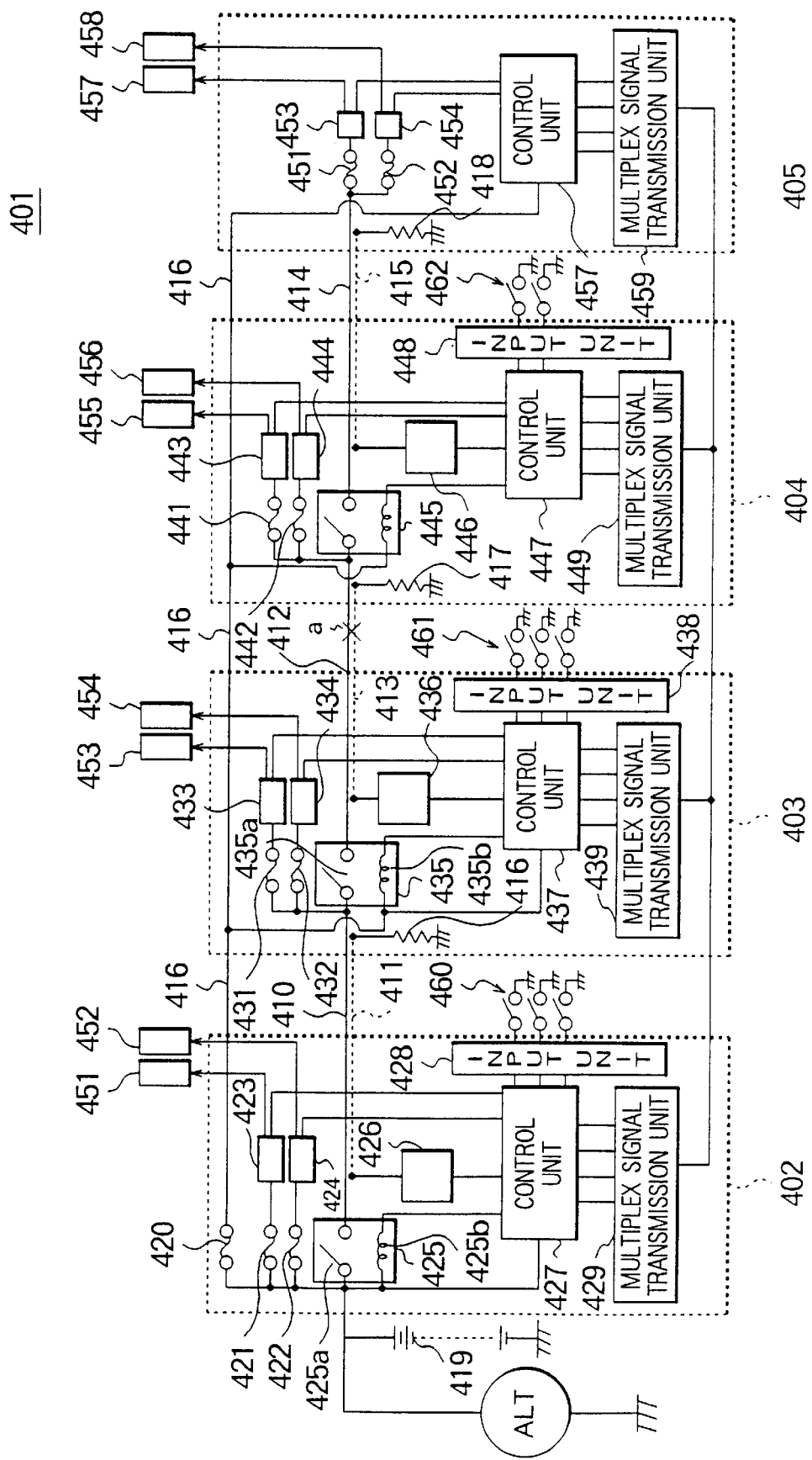
FIG. 11 is a view of the configuration of a vehicular use power feed apparatus according to a ninth embodiment of the present invention.

FIG. 11 is a view of the configuration of a vehicular use power feed apparatus 401 according to a ninth embodiment.

As shown in FIG. 11, the vehicular use power feed apparatus 401 is configured with a battery 419 and power distribution units 402, 403, 404, and 405 are sequentially connected in series via load drive use power feed lines.

The power distribution units 402, 403, 404, and 405 distribute the power supply voltage input from the battery 419 to loads which they handle.

In the power distribution unit 402, one ends of the fuses 420, 421, and 422 and relay switch circuit 425 and control unit 427 are connected in parallel to the plus electrode of the battery 419.

Other than this, the plus electrode of the battery 419 is connected to an alternator ALT output. The alternator ATL is designed to supply power to the loads and control unit connected to the plus electrode of the battery 419 at the time of engine operation and, at the same time, charge the battery 419 by its surplus power.

The other end of the fuse 420 is connected via a electronic control circuit drive use power feed line 416 to the control units 437, 447, and 457 and the relay switch circuits 425, 435, and 445. Namely, the power supply voltage from the battery 419 is fed via the electronic control circuit drive use power feed line 416 to the electronic control circuits such as the control units 437, 447, and 457 and the relay switch circuits 425, 435, and 445.

At this time, the electronic control circuit drive use power feed line 416 is used only for supplying a drive voltage for driving these electronic control circuits, therefore as the electronic control circuit drive use power feed line 416, a thin conductive wire having a small current carrying capacity is used.

Further, as the fuse 420, one having a small capacity is used so as to effectively suppress occurrence of rare short-circuits.

The other end of the fuse 21 is connected to the load 451 via the load use switch unit 423. The other end of the fuse 422 is connected to the load 452 via the load use switch unit 424.

Whether or not the power supply voltage is supplied from the battery 419 to the loads 451 and 452 is determined by the on/off control of the load use switch units 423 and 424 by the control unit 427.

The relay switch circuit 425 is provided with a switch 425*a* and coil 425*b*. One end of the switch 425*a* is connected to the plus electrode of the battery 419, while the other end is connected to the load drive use power feed line 410. Also, one end of the coil 425*b* is connected to the plus electrode of the battery 419, while the other end is connected to the control unit 427. The switch 425*a* is set to the connection (on) state when the coil 425*b* is energized by the control unit 427 and is set to the nonconnection (off) state when it is not energized.

The control unit 427 is further connected to an overheat detection unit 426, an input unit 428, and a multiplex signal transmission unit 429.

The overheat detection unit 426 is connected to one end of a sensor conductor 411 spirally wound around the load drive use power feed line 410 as will be explained later. The other end of the sensor conductor 411 is grounded via the resistor 414. Here, the load drive use power feed line 410 and sensor conductor 411 are incorporated in an overheat detection line.

Figure 12:
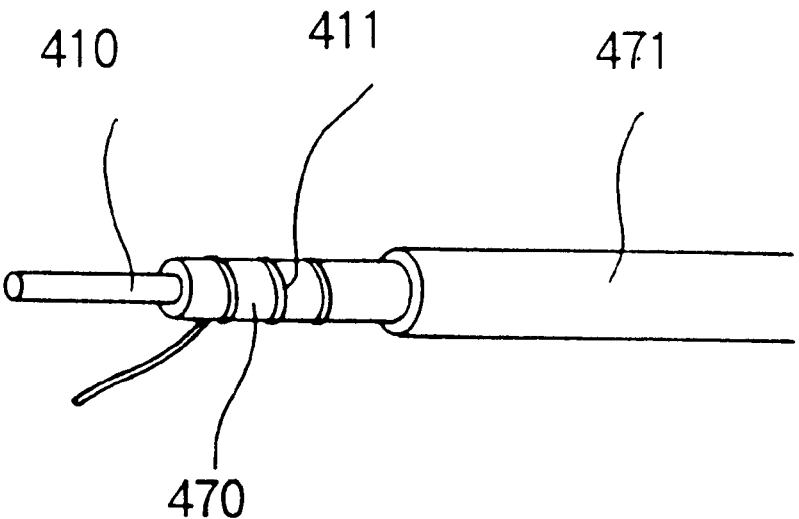
FIG. 12 is a view of the configuration of an overheat detection unit shown in FIG. 11.

The overheat detection line is, for example, as shown in FIG. 12, is comprised by covering a center conductor, that is, a load drive use power feed line 410, by a heat sensitive resin 470 which melts at about 180° C., winding an elastic sensor conductor around the heat sensitive resin 470, and further covering this by a resin 471. When the load drive use power feed line 410 is short-circuited with the chassis and generates a heat at a certain position, the heat sensitive resin 470 melts and the sensor conductor 411 and the load drive use power feed line 410 are short-circuited. At this time, if the sensor conductor 411 is biased to the ground, the sensor conductor 411 becomes the ground potential at normal times, but short-circuits with the load drive use power feed line 410 at the time of generation of heat and becomes more than the predetermined potential. The heat generation is detected from this potential.

Figure 13:
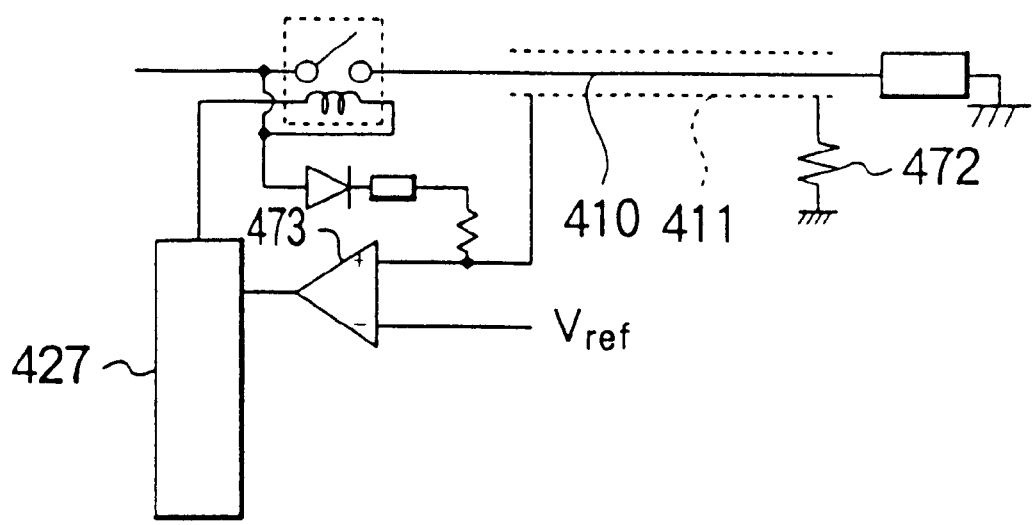
FIG. 13 is a view of the configuration of an overheat detection line.

FIG. 13 is a view explaining the configuration of the overheat detection unit 426.

As shown in FIG. 13, one end of the sensor conductor 411 is grounded via the resistor 472. Further, the other end of the sensor conductor 411 is connected to the plus input terminal of the operational amplifier 473. A reference voltage Vref is input to the minus input terminal of the operational amplifier 473. Namely, when the sensor conductor 411 is short-circuited with the load drive use power feed line 410, the voltage of the sensor conductor 411 becomes larger than the reference voltage Vref, and the output voltage of the operational amplifier is inverted from minus to plus. Accordingly, the control unit 427 detects the short-circuits of the load drive use power feed line 410 and the sensor conductor 411 by monitoring the output voltage of the operational amplifier 473.

The input unit 428 receives as its input the input signal indicating the on/off state of each switch 460 and the state of the sensor provided in the vehicle and outputs this input signal to the control unit 427.

The control unit 427 outputs the input signal input from the input unit 428 via the multiplex signal transmission unit 429, communication line 475, and multiplex signal transmission units 439, 447, and 459 to the control units 437, 447, and 457 of the power distribution units 403 to 405. The information of the vehicle is shared by the power distribution units 402 to 405.

The input signals of the other power distribution units 403 and 404 are similarly shared by the power distribution units 402 to 405.

The power distribution units 403 and 404 basically have the same configuration as that of the power distribution unit 402 except that the fuse 420 is not provided. Here, the power distribution unit 403 distributes power to the loads 453 and 454, while the power distribution unit 404 distributes power to the loads 455 and 456.

Contrary to this, the power distribution unit 405 is not provided with the relay switch circuit and overheat detection unit since the power distribution unit is not connected downstream of it. The power distribution unit 405 distributes power to the loads 457 and 458.

One example of the power distribution operation in the vehicular use power feed apparatus 401 explained above will be explained next.

Here, a case where the load 453 is a drive circuit driving a headlamp, the switch 460 is a switch for turning the head lamp on or off, and the user switches the switch 460 from off to on will be explained.

When the switch 460 is switched from off to on, an input signal indicating this switching operation is output via the input unit 428 to the control unit 427. The control unit 427 outputs this input signal via the multiplex signal transmission unit 429, the communication line 475, and the multiplex signal transmission units 439, 449, and 459 to the control units 437, 447, and 457 of the power distribution units 403, 404, and 405.

The control unit 437 decides that the switch 460 was turned on when receiving as its input the input signal from the control unit 427, turns on the load use switch unit 433 for driving the headlamp, and outputs the power supply voltage fed from the battery 419 via the load drive use power feed line 410 to the load 453. By this, the headlamp is turned on. On the other hand, when the switch 460 is switched from on to off, after going through similar processing, the load use switch unit 433 becomes off and the supply of the power from the battery 419 to the load 453 is stopped.

Below, a concept explanation will be made of the operation in the case where a short-circuit with the chassis occurs in the vehicular use power feed apparatus 401.

In the vehicular use power feed apparatus 401, when a short-circuit with the chassis occurs at the point a on the load drive use power feed line 412, the sensor conductor 413 and the load drive use power feed line 412 are short-circuited at the point a, and the voltage of the sensor conductor 413 becomes higher than the reference voltage Vref in the overheat detection unit 436. Then, at the overheat detection unit 436, the output of the operational amplifier corresponding to the operational amplifier 473 of the overheat detection unit 426 shown in FIG. 13 is switched from minus to plus. This switching is detected at the control unit 437. Then, the energizing of the relay switch circuit 435 by the control unit 437 is stopped, and the switch 435a is set to the nonconnection state. By this, the supply of power to the power distribution units 404 and 405 located downstream of the power distribution unit 403 is stopped, and the supply of power to the point a is stopped. As a result, the supply of power to the loads of the power distribution units 404 and 405 is stopped, but the power is supplied to the loads of the power distribution units 402 and 403 as usual.

As explained above, according to this vehicular use power feed apparatus 401, even in a case where trouble occurs in the load drive use power feed line, the trouble portion is isolated without performing complex processing such as transmission and reception of signals between the power distribution units and an adequate backup operation becomes possible. Further, at this time, the supply of power to the loads located upstream of the trouble is not interrupted in the load drive use power feed line.

Further, according to the vehicular use power feed apparatus 401, the power is supplied to a plurality of power distribution units by using a functionally single load drive use power feed line, therefore the space occupied by the wiring can be made small.

10th Embodiment

The vehicular use power feed apparatus of the 10th embodiment is comprised of a plurality of power distribution units arranged in the load drive use power feed line in the form of a loop.

Figure 14:
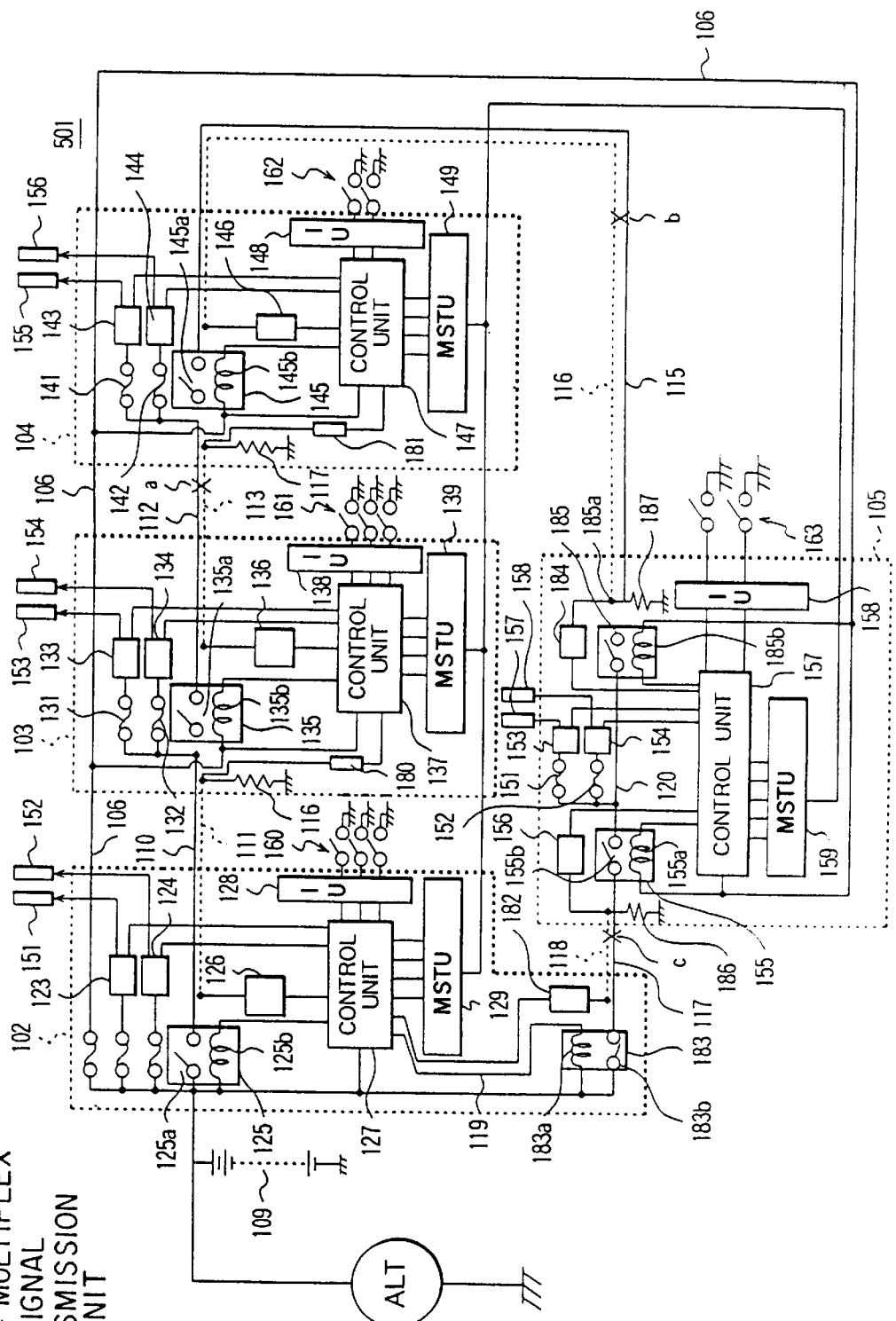
FIG. 14 is a view of the configuration of a vehicular use power feed apparatus according to a 10th embodiment of the present invention.

FIG. 14 is a view of the configuration of a vehicular use power feed apparatus 501 of the 10th embodiment.

As shown in FIG. 14, in the vehicular use power feed apparatus 501, the power distribution unit 102 is connected to the battery 109. Load drive use power feed lines are formed in a loop via the power distribution units 102, 103, 104, and 105.

More specifically, when all relay switch circuits are in the connection state, a loop is formed by the relay switch circuit 125, load drive use power feed line 110, relay switch circuit 135, load drive use power feed line 112, relay switch circuit 145, load drive use power feed line 115, relay switch circuit 185, load drive use power feed line 120, internal wiring of the power distribution unit 105, power supply breaker unit 155, load drive use power feed line 117, and relay switch circuit 183.

Other than this, the plus electrode of the battery 109 is connected to the alternator ALT output. The alternator ATL is constituted so as to feed power to the loads and control units connected to the plus electrode of the battery 109 at the time of engine operation and, at the same time, charge the battery 109 by its surplus power.

Here, the load drive use power feed lines 110, 112, 115, and 117 are incorporated in the overheat detection line explained above by referring to FIG. 12. Sensor conductors 111, 113, 116, and 118 are wound via a heat sensitive resin.

One end of the sensor conductor 111 is connected to the overheat detection unit 126 connected to the control unit 127 of the power distribution unit 102, while the other end is connected to the overheat detection unit 180 connected to the control unit 137 of the power distribution unit 103. Further, the sensor conductor 111 is grounded via the resistor 116.

One end of the sensor conductor 113 is connected to the overheat detection unit 136 connected to the control unit 137 of the power distribution unit 103, while the other end is connected to the overheat detection unit 181 connected to the control unit 147 of the power distribution unit 104. Further, the sensor conductor 113 is grounded via the resistor 117.

One end of the sensor conductor 116 is connected to the overheat detection unit 146 connected to the control unit 147 of the power distribution unit 104, while the other end is connected to the overheat detection unit 184 connected to the control unit 157 of the power distribution unit 105. Further, the sensor conductor 116 is grounded via the resistor 187.

One end of the sensor conductor 117 is connected to the overheat detection unit 156 connected to the control unit 157 of the power distribution unit 105, while the other end is connected to the overheat detection unit 182 connected to the control unit 127 of the power distribution unit 102. Further, the sensor conductor 117 is grounded via the resistor 186.

Namely, the power distribution units 102, 103, 104, and 105 are provided with overheat detection functions with respect to both load drive use power feed lines.

Further, the power distribution units 102, 103, and 104 supply power from the load drive use power feed lines, located at the left in the figure, of the relay switch circuits 125, 135, and 145 to the corresponding loads 151, 152, 153, 154, 155, and 156, respectively.

Contrary to this, in the power distribution unit 105, the power is fed from the load drive use power feed line 120 located between the relay switch circuit 185 and the relay switch circuit 155 to the corresponding loads 157 and 158.

Below, an explanation will be made of an example of the power distribution operation in this vehicular use power feed apparatus 501.

In the vehicular use power feed apparatus 501, in the usual operation mode, when the battery 109 is connected, the power is supplied to the control units 127, 137, 147, and 157 via the electronic control circuit drive use power feed line 106, and the relay switch circuits 125, 135, 145, 185, 155, and 183 are set in the connection (on) state.

The control units 127, 137, 147, and 157 monitor the input signals from the input units 128, 138, 148, and 158 and, when deciding that the vehicle is in the nonoperation state, set the relay switch circuits 125, 135, 145, 185, 155, and 183 to the nonconnection (off) state and, at the same time, enter the low power consumption mode.

In the low power consumption mode, the control unit enters a sleep state or stops the clock in the stopped state to suppress the power consumption of the electronic control circuit as a whole. It leaves the low power consumption mode and shifts to the usual operation mode due to interruption or the like to the required input.

When the vehicular use power feed apparatus 501 is operating in the low power consumption mode, for example, if the switch 161 of the headlamp is turned on, the input signal thereof is input to the control unit 137 via the input unit 138. By this, the control unit 137 shifts to the usual operation mode and sets the switch 135*a* of the relay switch circuit 135 to the connection (on) state. This information is output via the communication line 190 from the multiplex signal transmission unit 139 to the multiplex signal transmission units 129, 149, and 159 of the other power distribution units 102, 104, and 105. By this, the control units 127, 147, and 157 shift to the usual operation mode, the relay switch circuits 125, 183, 145, 185, and 155 enter the connection (on) state, and power is supplied to all of the power distribution units 102, 103, 104, and 105.

Then, the control unit 157 turns on the load use switch unit 153 corresponding to the headlamp based on the input signal indicating the headlamp upon input from the control unit 127.

Below, a detailed explanation will be made of the operation where a short-circuit with the chassis occurs in the vehicular use power feed apparatus 501.

For example, when the point a on the load drive use power feed line 112 shown in FIG. 14 is short-circuited with the ground, the heat generation at the point a is simultaneously detected at the overheat detection units 136 and 181 of the power distribution units 103 and 104 at the two sides. By this, the control units 137 and 147 respectively stop the energizing of the coils 135*b* and 145*b* of the relay switch circuits 135 and 145 and set the switches 135*a* and 145*a* to the nonconnection (off) state.

As a result, the load drive use power feed line 112 where the abnormality encompassing the point a occurs is separated from the power feed loop. Power is not supplied to the loads 155 and 156 of the power distribution unit 104, but a stoppage of function of the entire system can be avoided. Further, when separating this abnormal point a, the power supply is not switched, therefore there is no momentary interruption in the supply of power to loads other than the loads 155 and 156.

Further, for example, where the point b on the load drive use power feed line 115 is short-circuited with the ground, this short-circuit is simultaneously detected at the power distribution units 104 and 105 at the two sides of the load drive use power feed line 115. By this, the control units 147 and 157 of the power distribution units 104 and 105 respectively stop the energizing of the coils 145*b* and 185*b* of the relay switch circuits 145 and 185 to set the switches 145*a* and 185*a* to the nonconnection (off) state.

As a result, the load drive use power feed line 115 where the abnormality encompassing the point b occurs is separated from the power feed loop, and deterioration of the function of the entire system is avoided. Further, when separating this abnormal point b, the power supply is not switched, therefore there is no momentary interruption in the supply of power to the loads.

Further, for example, where the point c on the load drive use power feed line 117 is short-circuited with the ground, this short-circuit is simultaneously detected at the power distribution units 102 and 105 on the two sides of the load drive use power feed line 117. By this, the control units 127 and 157 of the power distribution units 102 and 105 respectively stop the energizing of the coils 183*b* and 155*b* of the relay switch circuits 183 and 155 to set the switches 183*a* and 153*a* to the nonconnection (off) state.

As a result, the load drive use power feed line 117 where the abnormality encompassing the point c occurs is separated from the power feed loop, and stoppage of function of the entire system is avoided. Further, when separating this abnormal point c, the power supply is not switched, therefore there is no momentary interruption in the supply of power to the load.

As explained above, according to the vehicular use power feed apparatus 501, by forming the load drive use power feed line in a loop and providing the overheat detection unit for detecting the heat generation of the relay switch circuit and the load drive use power feed lines on the two sides in each power distribution unit, it is possible to adequately isolate a trouble part and avoid stoppage of the power feed function to all loads. If the vehicular use power feed apparatus 501 is used for example for starting an engine and in the control use power supply, the vehicle can be operated no matter what the case.

The present invention is not limited to the above embodiment either. For example, other than a combination of the overheat detection line and the overheat detection unit, it is also possible for the heat generation detecting means to provide for example an optical fiber in the load drive use power feed line and observe the optical output at the emitting side continuously or for a predetermined period with respect to the optical input from the incident side. According to this procedure, if abnormal heat generation occurs in the load drive use power feed line, the corresponding optical fiber is softened and an increase of the amount of loss of the optical output is observed. For this reason, by measuring the loss of the optical output, it can be detected whether or not the load drive use power feed line was short-circuited.

Further, in the above embodiment, a case where a plurality of power distribution units were connected in series as shown in FIG. 11 or connected in the form of a loop as shown in FIG. 14 was exemplified, but in the vehicular use power feed apparatus of the present invention, it is also possible to connect a plurality of power distribution units in for example a branch or parallel form.

Further, in the present invention, it is also possible to use a PTC element as the material melted by heat generation. This PTC element is an element that has a resistance value abruptly raised at a predetermined temperature due to its own heat generation.

As explained above, according to the vehicular use power feed apparatus of this embodiment, even in a case where trouble occurs in the load drive use power feed line source, the trouble portion can be isolated without performing complex processing and an adequate backup operation performed. Further, at this time, there is no momentary interruption in the supply of power to the loads located upstream of the trouble portion in the load drive use power feed line.

Further, according to the vehicular use power feed apparatus of the present invention, the power is fed to a plurality of equipment mounted in a vehicle by using a functionally single load drive use power feed line, therefore the space occupied by the wiring can be made small and also the manufacturing cost can be reduced.

11th Embodiment

Figure 15:
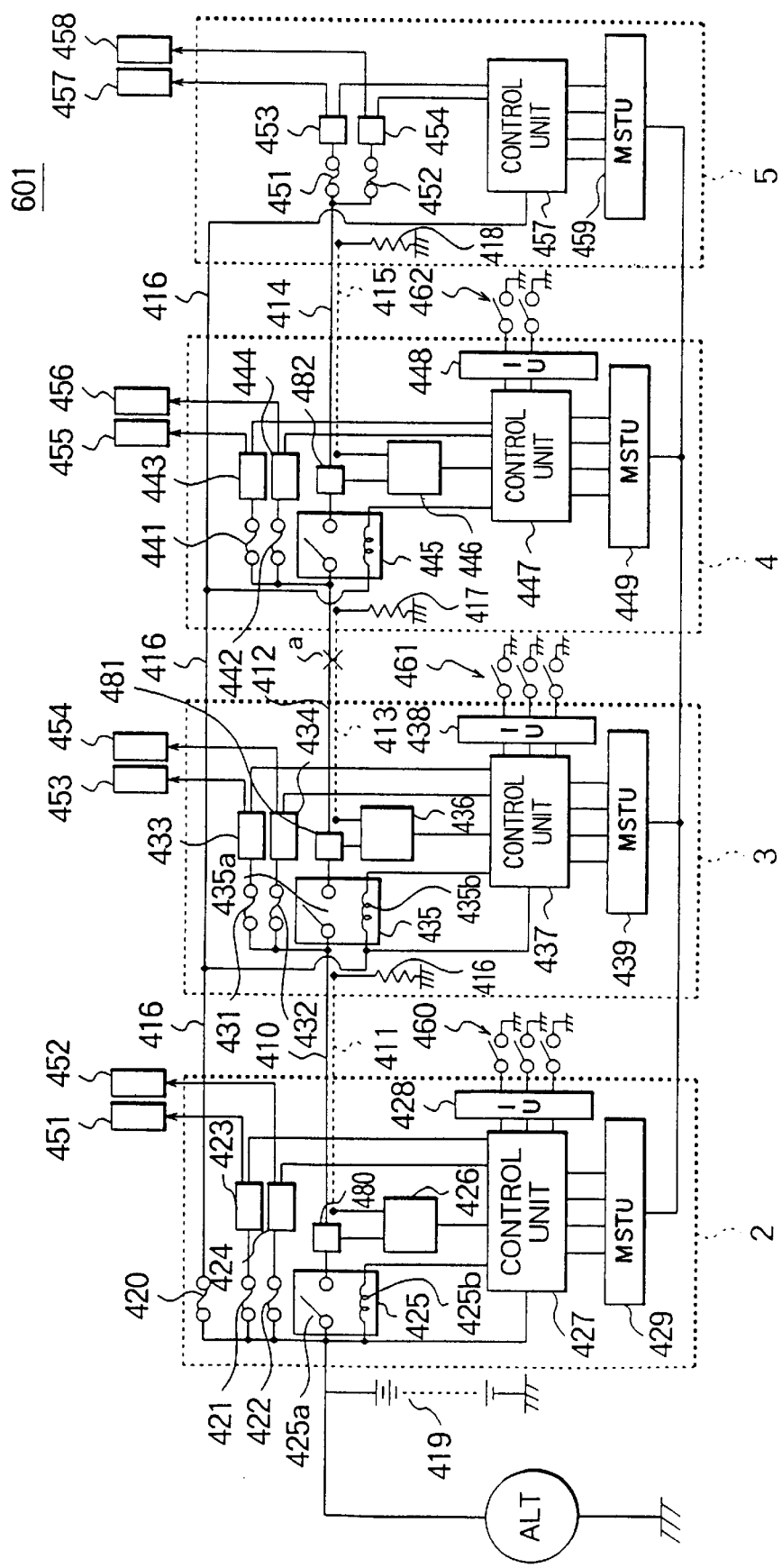
FIG. 15 is a view of the configuration of a vehicular use power feed apparatus according to an 11th embodiment of the present invention.

FIG. 15 is a view of the configuration of a vehicular use power feed apparatus 601 according to an 11th embodiment.

As shown in FIG. 15, the vehicular use power feed apparatus 601 is comprised of a battery 419 and power distribution units 402, 403, 404, and 405 sequentially connected in series via the load drive use power feed lines.

The power distribution units 402, 403, 404, and 405 distribute the power supply voltage input from the battery 419 to loads handled by them.

In the power distribution unit 402, one ends of fuses 420, 421, and 422 and relay switch circuit 425 and control unit 427 are connected in parallel to the plus electrode of the battery 419.

Other than this, the plus electrode of the battery 419 is connected to an alternator ALT output. The alternator ATL is constituted so as to supply power to the load and control units connected to the plus electrode of the battery 419 at the time of engine operation and, at the same time, charge the battery 419 by its surplus power.

The other end of the fuse 420 is connected via a electronic control circuit drive use power feed line 416 to the control units 437, 447, and 457 and the relay switch circuits 425, 435, and 445. Namely, the power supply voltage from the battery 419 is fed via the electronic control circuit drive use power feed line 416 to the electronic control circuits such as the control units 437, 447, and 457 and the relay switch circuits 425, 435, and 445.

At this time, the electronic control circuit drive use power feed line 416 is used only for feeding the drive voltage for driving these electronic control circuits, therefore as the electronic control circuit drive use power feed line 416, a thin conductive wire having a small current carrying capacity is used.

Further, as the fuse 420, one having a small capacity is used so as to effectively suppress the occurrence of the rare short-circuits.

The other end of the fuse 21 is connected to the load 451 via the load use switch unit 423. The other end of the fuse 422 is connected to the load 452 via the load use switch unit 424.

Whether or not the power supply voltage is fed from the battery 419 to the loads 451 and 452 is determined by the on/off control of the load use switch units 423 and 424 by the control unit 427.

The relay switch circuit 425 is provided with a switch 425a and coil 425b. One end of the switch 425a is connected to the plus electrode of the battery 419, while the other end is connected to the load drive use power feed line 410 via the current monitoring unit 480. Also, one end of the coil 425b is connected to the plus electrode of the battery 419, while the other end is connected to the control unit 427. The switch 425a is set to the connection (on) state when the coil 425b is energized by the control unit 427, while is set to the nonconnection (off) state when it is not energized.

The control unit 427 is further connected to the interference detection unit 426, the input unit 428, and the multiplex signal transmission unit 429.

The current monitoring unit 480 monitors the value of current flowing through the load drive use power feed line 410 in real time and judges there is an abnormality where this current value exceeds the current capacity of the load drive use power feed line 410 continuously for a predetermined time or, even if the time when the current value continuously exceeds the current capacity is within a predetermined time, judges there is an abnormality when the number of times and frequency thereof exceed the predetermined reference.

The current monitoring unit 80 connects for example a small resistor in series to the load drive use power feed line 410 and measures the voltage produced at the two ends of this small resistor or passes the load drive use power feed line 410 through a Hall effect element and magnetically measures the current value by the noncontact method.

Note that it is possible for the current monitoring unit 480 not to judge the existence of an abnormality, but for the current monitoring unit 480 to monitors only the current value and to have the control unit 427 judge the existence of an abnormality based on the current value from the current monitoring unit 480.

The interference detection unit 426 is connected to one end of the sensor conductor 411 spirally wound around the load drive use power feed line 410. The other end of the sensor conductor 411 is grounded via the resistor 416. Here, the load drive use power feed line 410 and the sensor conductor 411 are incorporated in the interference detection line.

The interference detection line is constituted by for example, as shown in FIG. 12, covering a center conductor, that is, the load drive use power feed line 410, by PVC or another Insulator 470, winding a copper foil or other sensor conductor 411 for detecting interference around the insulator 470, and further covering this with a resin 471. If the load drive use power feed line 410 is short-circuited with the chassis at a certain position, the sensor conductor 411 is short-circuited with the chassis, that is, the ground, before this, therefore the short-circuiting of the load drive use power feed line 410 can be detected in advance.

The voltage of the load drive use power feed line 410 is set at an intermediate voltage between the power supply voltage supplied from the battery 419 and the ground voltage.

Figure 16:
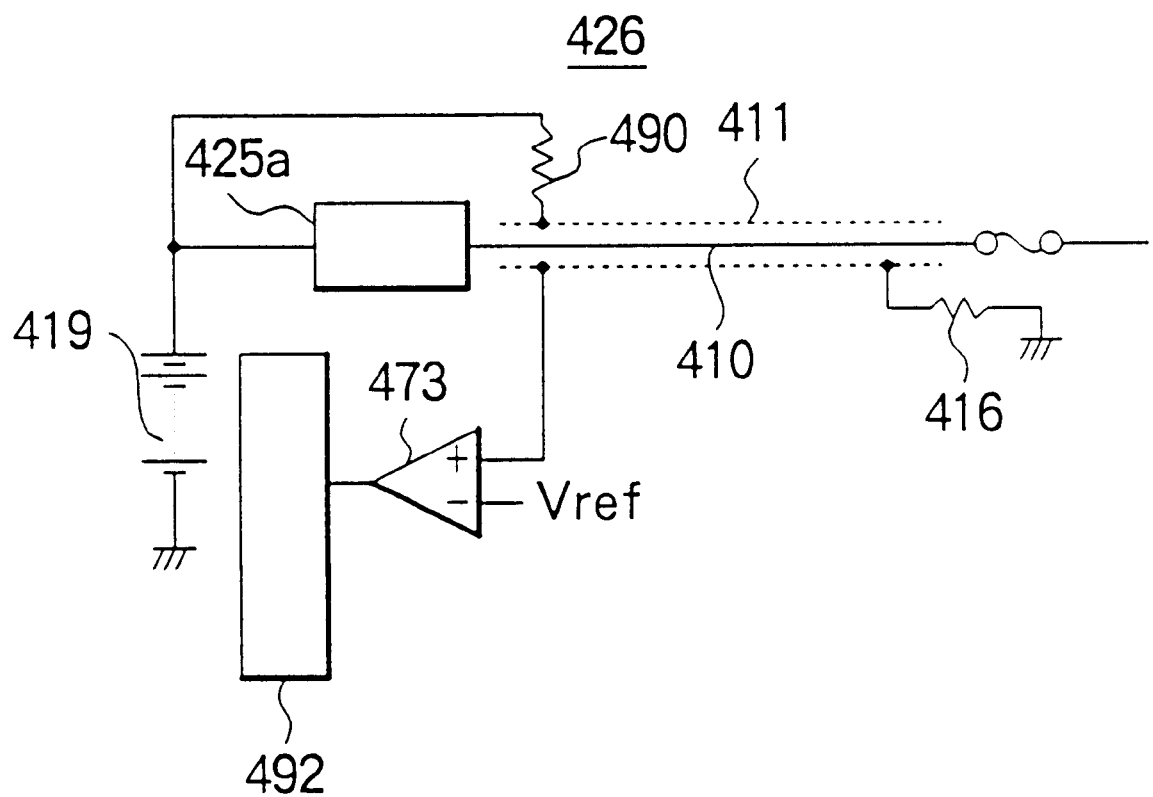
FIG. 16 is a view of the configuration of an interference detection line.

FIG. 16 is a view for explaining the configuration of the interference detection unit 426.

As shown in FIG. 16, one end of the sensor conductor 411 is grounded via the resistor 416. Further, the other end of the sensor conductor 411 is connected to the plus electrode of the battery 419 via the resistor 490 and, at the same time, connected to the plus input terminal of the operational amplifier 473. At this time, the resistance values of the resistor 416 and the resistor 490 are the same, and the voltage of the sensor conductor 411 is set at an intermediate voltage Vbat/2 between the power supply voltage Vbat of the battery 419 and the ground.

Further, the reference voltage Vref is input to the minus input terminal of the operational amplifier 473. Here, the reference voltage Vref is the voltage between the intermediate voltage Vbat/2 and ground.

In the interference detection unit 426, when the load drive use power feed line 410 is short-circuited with the chassis, the sensor conductor 411 is short-circuited with the chassis preceding this, the voltage of the sensor conductor 411 is lowered to the ground and becomes smaller than the reference voltage Vref, and the output voltage of the operational amplifier 473 is inverted from minus to plus. The judgement unit 492 detects that the sensor conductor 411 was short-circuited (interfered) with the chassis by monitoring the output voltage of the operational amplifier 473.

The input unit 428 receives as its input the input signal indicating the on/off state of each switch 460 and the state of the sensor provided in the vehicle and outputs this input signal to the control unit 427.

The control unit 427 outputs the input signal input from the input unit 428 via the multiplex signal transmission unit 429, communication line 475, and multiplex signal transmission units 439, 447, and 459 to the control units 437, 447, and 457 of the power distribution units 403 to 405. The information of the vehicle is shared in the power distribution units 402 to 405.

Also, the input signals of the other power distribution units 403 and 404 are similarly shared by the power distribution units 402 to 405.

The power distribution units 403 and 404 basically have the same configuration as that of the power distribution unit 402 except that the fuse 420 is not provided. Here, the power distribution unit 403 distributes the power to the loads 453 and 454, and the power distribution unit 404 distributes the power to the loads 455 and 456.

Contrary to this, the power distribution unit 405 is not provided with the relay switch circuit and interference detection unit since the power distribution unit is not connected downstream thereof. The power distribution unit 405 distributes the power to the loads 457 and 458.

One example of the power distribution operation in the vehicular use power feed apparatus 601 explained above will be explained next.

Here, a case where the load 453 is a drive circuit driving a headlamp, the switch 460 is a switch for turning the head lamp on or off, and the user switches the switch 460 from off to on will be exemplified.

When the switch 460 is switched from off to on, the input signal indicating this switching operation is output via the input unit 428 to the control unit 427. The control unit 427 outputs this input signal via the multiplex signal transmission unit 429, the communication line 475, and the multiplex signal transmission units 439, 449, and 459 to the control units 437, 447, and 457 of the power distribution units 403, 404, and 405.

The control unit 437 decides that the switch 460 was turned on when receiving as its input the input signal from the control unit 427, turns on the load use switch unit 433 for driving the headlamp, and outputs the power supply voltage fed from the battery 419 via the load drive use power feed line 410 to the load 453. By this, the headlamp is turned on. On the other hand, when the switch 460 is switched from on to off, after passing through similar processing, the load use switch unit 433 becomes off, and the supply of the power from the battery 419 to the load 453 is interrupted.

Below, a detailed explanation will be made of the operation of the case where a short-circuit with the chassis occurs in the vehicular use power feed apparatus 601.

In the power distribution unit 601, when the load drive use power feed line 412 is short-circuited with the chassis at the point a, the sensor conductor 413 is short-circuited with the chassis at the point a preceding this and the voltage of the sensor conductor 413 is dropped to the ground voltage and becomes lower than the reference voltage Vref in the interference detection unit 436. Then, in the interference detection unit 436, the output of the operational amplifier corresponding to the operational amplifier 473 of the interference detection unit 426 shown in FIG. 16 is switched from minus to plus. This switching is detected at the logic circuit 492. Then, based on the detection result of the logic circuit 492, interference (alarm) information is output from the control unit 437 via the multiplex signal transmission unit 439 to the multiplex signal transmission units 429, 449, and 459. Then, for example, when the load 455 is an alarm display unit, the control unit 447 switches the load use switch unit 443 to on based on the interference information input via the multiplex signal transmission unit 449, and the power supply voltage is fed to the load 455. By this, an alarm is displayed in the alarm display unit as the load 455.

Further, the control units 427, 447, and 457 learn of the occurrence of interference on the load drive use power feed line 412 between the power distribution unit 403 and the power distribution unit 404 from the interference information, while the control unit 437 learns this from the result of detection of the logic circuit 492. By this, the control units 437 and 447 set the time constant from when the current monitoring units 481 and 482 detect the abnormal current to when the relay switch circuits 435 and 445 set the switches 435a and 445a to the nonconnection state to 100 ms. Further, the control unit 427 sets the time constant from when the current monitoring unit 80 detects the abnormal current to when the relay switch circuit 425 sets the switch 425a to the nonconnection state to 200 ms.

In many cases, suitable repair by for example the user is carried out based on the interference information, but in a state before repair due to heavy interference and if the interference is light and the trouble is allowed to stand without repair, since the load drive use power feed line 410 contacts the chassis, an overcurrent flows through the load drive use power feed line in the power distribution units 402 and 403. As a result, the current monitoring units 480 and 481 judge that there is an abnormality in the current.

Then, since the control unit 437 sets the time constant to 100 ms as explained above, it stops the energizing after an elapse of 100 ms from detection of the abnormal current by the current monitoring unit 481 and sets the switch 435a of the relay switch circuit 435 to the nonconnection state. At this time, since the control unit 27 sets the time constant to 200 ms as explained above, its holds the switch 425a of the relay switch circuit 425 in the connection state.

By this, the supply of power to the power distribution units 404 and 405 located downstream of the power distribution unit 403 is stopped and also the supply of power to the point a is stopped. As a result, the supply of power to the loads of the power distribution units 404 and 405 is interrupted, but the power is supplied to the loads of the power distribution units 402 and 403 as usual.

Further, since the supply of power to the point a is stopped, the interference detection unit 426 does not detect an abnormality and the relay switch circuit 425 does not stop the supply of power.

As explained above, according to the vehicular use power feed apparatus 601, even in a case where trouble occurs in the load drive use power feed line, the trouble portion is isolated without performing complex processing such as transmission and reception of signals between power distribution units and a suitable backup operation can be carried out. Further, at this time, there is no momentary interruption in the supply of power to the loads located upstream of the trouble portion in the load drive use power feed line.

Further, according to the vehicular use power feed apparatus 601, the power is supplied to a plurality of power distribution units by using a functionally single load drive use power feed line, therefore the space occupied by the wiring can be made small.

12th Embodiment

The vehicular use power feed apparatus of the 12th embodiment is comprised of a plurality of power distribution units arranged in a load drive use power feed line in the form of a loop.

Figure 17:
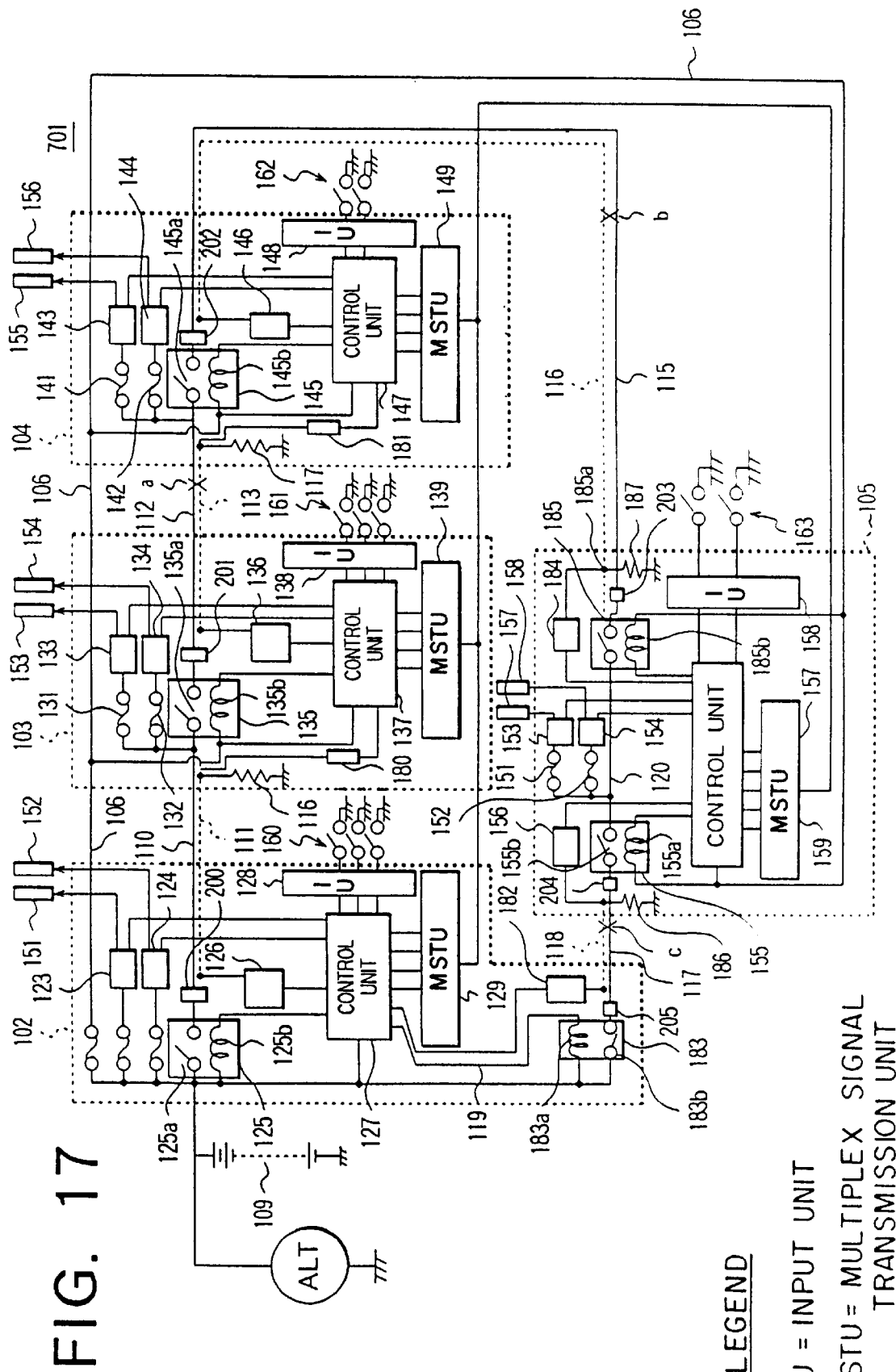
FIG. 17 is a view of the configuration of a vehicular use power feed apparatus according to a 12th embodiment of the present invention.

FIG. 17 is a view of the configuration of a vehicular use power feed apparatus 701 of the present embodiment.

As shown in FIG. 17, in the vehicular use power feed apparatus 701, the power distribution unit 102 is connected to the battery 109. The load drive use power feed lines are formed into a loop via the power distribution units 102, 103, 104, and 105.

More specifically, when all relay switch circuits are in the connection state, a loop is formed by the relay switch circuit 125, power supply monitoring unit 200, load drive use power feed line 110, relay switch circuit 135, power supply monitoring unit 201, load drive use power feed line 112, relay switch circuit 145, power supply monitoring unit 202, load drive use power feed line 115, power supply monitoring unit 203, relay switch circuit 185, load drive use power feed line 120, relay switch circuit 155, power supply monitoring unit 204, load drive use power feed line 117, power supply monitoring unit 205, and relay switch circuit 183.

Other than this, the plus electrode of the battery 109 is connected to the alternator ALT output. The alternator ATL is constituted so as to supply power to the loads and control units connected to the plus electrode of the battery 109 at the time of engine operation and, at the same time, charge the battery 109 by its surplus power.

Here, the load drive use power feed lines 110, 112, 115, and 117 are incorporated in an interference detection line explained above by referring to FIG. 12. Sensor conductors 111, 113, 116, and 118 are wound via a heat sensitive resin.

One end of the sensor conductor 111 is connected to the interference detection unit 126 connected to the control unit 127 of the power distribution unit 102, while the other end is connected to the interference detection unit 180 connected to the control unit 137 of the power distribution unit 103. Further, the sensor conductor 111 is grounded via the resistor 116.

One end of the sensor conductor 113 is connected to the interference detection unit 136 connected to the control unit 137 of the power distribution unit 103, while the other end is connected to the interference detection unit 181 connected to the control unit 147 of the power distribution unit 104. Further, the sensor conductor 113 is grounded via the resistor 117.

One end of the sensor conductor 116 is connected to the interference detection unit 146 connected to the control unit 147 of the power distribution unit 104, while the other end is connected to the interference detection unit 184 connected to the control unit 157 of the power distribution unit 105. Further, the sensor conductor 116 is grounded via the resistor 187.

One end of the sensor conductor 118 is connected to the interference detection unit 156 connected to the control unit 157 of the power distribution unit 105, while the other end is connected to the interference detection unit 182 connected to the control unit 127 of the power distribution unit 102. Further, the sensor conductor 118 is grounded via the resistor 186.

Namely, the power distribution units 102, 103, 104 and 105 are provided with the interference detection function with respect to the both sides load drive use power feed lines.

Further, the power distribution units 102, 103, and 104 supply the power from the load drive use power feed lines, located at the left in the figure, of the relay switch circuits 125, 135, and 145 to corresponding loads 151, 152, 153, 154, 155, and 156, respectively.

Contrary to this, in the power distribution unit 105, the power is supplied from the load drive use power feed line 120 located between the relay switch circuit 185 and the relay switch circuit 155 to the corresponding loads 157 and 158.

Below, an explanation will be made of an example of the power distribution operation in the vehicular use power feed apparatus 701.

In the vehicular use power feed apparatus 701, in the usual operation mode, when the battery 109 is connected, the power is supplied to the control units 127, 137, 147, and 157 via the electronic control circuit drive use power feed line 106, and the relay switch circuits 125, 135, 145, 185, 155, and 183 are set in the connection (on) state.

The control units 127, 137, 147, and 157 monitor the input signals from the input units 128, 138, 148, and 158 and, when deciding that the vehicle is in the nonoperation state, sets the relay switch circuits 125, 135, 145, 185, 155, and 183 to the nonconnection (off) state and, at the same time, enter the low power consumption mode.

In the low power consumption mode, the control unit enters a sleep state or stops the clock in the stopped state to suppress the power consumption of the electronic control circuit as a whole and leaves the low power consumption mode by interruption or the like at the required input to shift to the usual operation mode.

When the vehicular use power feed apparatus 701 is operating in the low power consumption mode, for example, if the switch 161 of the headlamp is turned on, the input signal thereof is input to the control unit 137 via the input unit 138. By this, the control unit 137 shifts to the usual operation mode and sets the switch 135a of the relay switch circuit 135 to the connection (on) state. This information is output via the communication line 190 from the multiplex signal transmission unit 139 to the multiplex signal transmission units 129, 149, and 159 of the other power distribution units 102, 104, and 105. By this, the control units 127, 147, and 157 shift to the usual operation mode, the relay switch circuits 125, 183, 145, 185 and 155 are set to the connection (on) state, and the power is supplied to all of the power distribution units 102, 103, 104, and 105.

The control unit 157 turns on the load use switch unit 153 corresponding to the headlamp based on the input signal indicating the headlamp input from the control unit 127.

Below, a detailed explanation will be made of the operation where a short-circuit with the chassis occurs in the vehicular use power feed apparatus 701.

For example, where the point a on the load drive use power feed line 112 shown in FIG. 17 is short-circuited with the chassis, the sensor conductor 113 is short-circuited with the chassis at the point a preceding this and the voltage of the sensor conductor 113 is dropped to the ground voltage and becomes lower than the reference voltage Vref in the interference detection unit 136. Then, the interference detection unit 136 switches the output of the operational amplifier corresponding to the operational amplifier 73 of the interference detection unit 26 shown in FIG. 16 from minus to plus. This switching is detected at the control unit 137. Then, the interference (alarm) information is output from the control unit 137 via the multiplex signal transmission unit 139 to the multiplex signal transmission units 129, 149, and 159. Then, for example, where the load 155 is the alarm display unit, the control unit 147 switches the load use switch unit 143 on based on the interference information input via the multiplex signal transmission unit 149, and the power supply voltage is fed to the load 155. By this, the alarm is displayed in the alarm display unit serving as the load 155.

Further, the control units 127, 137, 147, and 157 decide on the occurrence of interference on the load drive use power feed line 112 between the power distribution unit 103 and the power distribution unit 104 from the interference information. By this, the control units 137 and 147 set the time constant from when the current monitoring units 101 and 202 detect the abnormal current to when the relay switch circuits 135 and 145 set the switches 135a and 145a to the nonconnection state to 100 ms. Further, the control units 127 and 157 set the time constant from when the current monitoring units 200 and 203 detect the abnormal current to when the relay switch circuits 125 and 185 set the switches 125a and 185a to the nonconnection state to 200 ms. Further, the control unit 157 sets the time constant from when the current monitoring unit 204 detects the abnormal current to when the relay switch circuit 155 sets the switch 155a to the nonconnection state to 300 ms.

Then, when the point a on the load drive use power feed line 112 is short-circuited with the chassis, the abnormality in the current is substantially simultaneously detected at all current monitoring units 200 to 205.

Next, after 100 ms from the timing at which the abnormality in the current is detected, first, the energizing of the relay switch circuits 135 and 145 by the control units 137 and 147 is stopped and the switches 135a and 145 are set to the nonconnection state. By this, the point a is isolated from the vehicular use power feed apparatus 701, the abnormal current is no longer detected at the current monitoring units 200, 203, 204, and 205, and the power supply is not cut at the relay switch circuits 125, 185, 155, and 183.

At this time, power is not supplied to the loads 155 and 156 of the power distribution unit 104, but stoppage of the function of the entire system can be avoided. Further, when performing the switching of this abnormal point a, there is no switching operation of the power supply, so there is no momentary interruption in the supply of power to the loads other than the loads 155 and 156.

Further, for example, where the point b on the load drive use power feed line 115 is short-circuited with the chassis, the sensor conductor 115 is short-circuited with the chassis preceding the short-circuit. The short-circuit is simultaneously detected at the power distribution units 104 and 105 on the two sides of the load drive use power feed line 115. Next, the abnormality in the current is simultaneously detected An in all power distribution units 200 to 205. The control units 147 and 157 stop the energizing of the coils 145b and 185b of the relay switch circuits 145 and 185 and set the switches 145a and 185a to the nonconnection (off) state.

As a result, the load drive use power feed line 115 where the abnormality encompassing the point b occurs is separated from the power feed loop, and stoppage of function of the entire system is avoided. Further, when isolating this abnormal point b, there is no switching operation of the power supply. Therefore, there is no momentary interruption in the supply of power to all loads.

Further, for example, where the point c on the load drive use power feed line 117 is short-circuited with the chassis, the sensor conductor 118 is short-circuited with the chassis at the point c preceding this, and the voltage of the sensor conductor 118 is dropped to the ground voltage and becomes lower than the reference voltage Vref in the interference detection units 156 and 182. Then, in the interference detection units 156 and 182, the output of the operational amplifier corresponding to the operational amplifier 473 of the interference detection unit 426 shown in FIG. 16 is switched from minus to plus. This switching is detected at the control units 127 and 157. Then, the interference (alarm) information is output from the control units 127 and 157 via the multiplex signal transmission units 129 and 159 to the multiplex signal transmission units 139, 149, and 159. Then, for example, where the load 155 is the alarm display unit, the control unit 147 switches the load use switch unit 143 on based on the interference information input via the multiplex signal transmission unit 149. The power supply voltage is fed to the load 155. By this, the alarm is displayed in the alarm display unit serving as the load 155.

Further, the control units 127, 137, 147, and 157 decide there is occurrence of interference on the load drive use power feed line 117 between the power distribution unit 102 and the power distribution unit 105 from the interference information. By this, the control units 127 and 157 set the time constant from when the current monitoring units 205 and 204 detect the abnormal current to when the relay switch circuits 183 and 155 set the switches 183a and 155a to the nonconnection state to 100 ms. Further, the control unit 157 sets the time constant from when the current monitoring unit 203 detects the abnormal current to when the relay switch circuit 185 sets the switch 185a to the nonconnection state to 200 ms. Further, the control unit 147 sets the time constant from when the current monitoring unit 202 detects the abnormal current to when the relay switch circuit 145 sets the switch 145a to the nonconnection state to 250 ms. Also, the control unit 137 sets the time constant from when the current monitoring unit 201 detects the abnormal current to when the relay switch circuit 135 sets the switch 135a to the nonconnection state to 300 ms. Further, the control unit 127 sets the time constant from when the current monitoring unit 200 detects the abnormal current to when the relay switch circuit 125 sets the switch 125a to the nonconnection state to 350 ms.

Namely, in the present embodiment, there is a large difference in the setup of the time constant between the relay switch circuits located on the two sides of short-circuit (interference) point and the next further relay switch circuit, but the difference of the time constants is made small for the others since the probability of short-circuits is small. The time constant may be set all the same for other than the relay switch circuits located for example at the two ends of the short-circuit point.

Next, at the point c, the load drive use power feed line 117 is short-circuited with chassis and the abnormality in the current is simultaneously detected in all current monitoring units 200 to 205.

Then, after an elapse of 100 ms from the detection of the abnormality in the current, first, the energizing of the relay switch circuits 183 and 155 by the control units 127 and 157 is stopped, and the switches 183a and 155a become the nonconnection state. By this, the point c is separated from the loop of the load drive use power feed lines, no abnormality in the current is detected in the current monitoring units 200, 201, 202, and 203, and the power supply is not interrupted in the relay switch circuits 125, 135, 145, and 185.

As a result, power is supplied to all loads of the power distribution units 102, 103, 104, and 105, and the stoppage of function of the entire system can be avoided. Further, when switching this abnormal point c, the switching operation of the power supply is not carried out, therefore the supply of power to the load is not instantaneously stopped.

As explained above, according to the vehicular use power feed apparatus 701, by forming the load drive use power feed line in a loop and providing the interference detection unit for detecting the interference of the relay switch circuit and the load drive use power feed lines on the two sides in each power distribution unit, the trouble part is adequately separated, and the stoppage of the power feed function to all loads can be avoided. If the vehicular use power feed apparatus 701 is used for example for starting an engine and in the control use power supply, the vehicle can be moved in any case.

The present invention is not limited to the above embodiment. For example, in the above embodiment, a case where a plurality of power distribution units were connected in series as shown in FIG. 15 or connected in the form of a loop as shown in FIG. 17 was exemplified, but in the vehicular use power feed apparatus of the present invention, it is also possible to connect a plurality of power distribution units in for example a branch or parallel form.

Further, in the above embodiment, a case where a time after the current monitoring unit detected the abnormality in the current until the relay switch circuit intercepted the connection was determined in the control unit was shown by way of example, it is also possible for the current monitoring unit to determine the time until the abnormality in the current is detected at the control unit after the current exceeds the predetermined current capacity, and for the control unit to immediately set the switch to the nonconnection state after detecting the abnormality in the current by the current monitoring unit.

As explained above, according to the vehicular use power feed apparatus of the present invention, even in a case where trouble occurs in the load drive use power feed line, the trouble portion is separated without performing complex processing and an adequate backup operation can be carried out. Further, at this time, the supply of power to the load located upstream of the trouble portion is not instantaneously stopped in the load drive use power feed line.

Further, according to the vehicular use power feed apparatus of the present invention, the power is supplied to a plurality of units of equipment mounted in a vehicle by using a functionally single load drive use power feed line, therefore the space occupied by the wiring can be made small and also the manufacturing costs can be reduced.

What is claimed is:

1. A vehicular use power feed apparatus comprised of a battery and a plurality of power distribution devices connected in the form of a loop via power feed lines, power being supplied from each of the power distribution devices to an electric load mounted in the vehicle, wherein each of the plurality of power distribution devices comprises;
a first switch means connected to one power feed line;
a second switch means connected to another power feed line;
a power feed state monitoring means for monitoring the state of power supplied through the first switch means and the second switch means;
a signal transmitting means for performing the communication with an adjoining power distribution device; and
a controlling means for controlling the operating states of the first and second switch means by referring to information from the signal transmitting means and information from the power feed monitoring means.

2. A vehicular use power feed apparatus as set forth in claim 1, wherein:

the power feed monitoring means comprises:
a current detection element provided between the first switch means and the second switch means,
a current direction detecting means for detecting the direction of the current flowing through the current detection element, and
an overcurrent detecting means for detecting whether or not the current flowing through the current detection element is excessive; and the controlling means transmits the signal obtained at the overcurrent detecting means and the direction of the current detected at the current direction detecting means to the adjoining power distribution device via the signal transmitting means,
receives these detection states from the adjoining power distribution device via the signal transmitting means,
pinpoints a trouble point by referring to the signal obtained at the overcurrent detecting means and the direction of current detected at the current direction detecting means inside itself and the signal obtained at the overcurrent detecting means and the direction of the current detected at the current direction detecting means in the adjoining power distribution device,
cooperates with the adjoining power distribution device so as to isolate the trouble point by operating one of the first switch means and the second switch means to establish a connection, and
establishes a new power feed line by operating the other of the first switch means and the second switch means to establish a connection.

3. A vehicular use power feed apparatus as set forth in claim 1 or 2, wherein:

the power feed monitoring means comprises:

a voltage detecting means provided between the first switch means and the second switch means and a voltage level detecting means for detecting if a voltage detected at the voltage detecting means is a predetermined level or less; and the controlling means transmits a low level detection signal obtained at the voltage level detecting means to an adjoining power distribution device via the signal transmitting means, receives a low level detection signal from an adjoining power distribution device via the signal transmitting means, pinpoints a trouble point by referring to the low level detection signal inside itself and the low level detection signal from the adjoining power distribution device, cooperates with the adjoining power distribution device to isolate the trouble point by operating one of the first switch means and the second switch means to establish a connection, and establishes a new power feed line by operating the other of the first switch means and the second switch means to establish a connection.

4. A vehicular use power feed apparatus comprising a battery, a main power distribution device directly receiving the supply of power from the battery, at least one sub power distribution devices, power feed lines connecting power feed portions between the main power distribution device and adjoining sub power distribution devices for supplying the power from the battery, and information transmission signal lines for transmitting information between the main power distribution device and at least one sub power distribution device, power being supplied from the battery to loads connected to the sub power distribution devices via the power feed lines, wherein, the main power distribution device comprises:

a controlling means, a signal transmitting means for transmitting information with the sub power distribution devices via the information transmission signal lines and for transmitting information with the controlling means;

at least two power feed lines for feeding power from the battery to the sub power distribution devices, at least two switch means for connecting or disconnecting the at least two power feed lines, and a trouble detecting means for detecting trouble in the power feed system outside of the switch means;

a sub power distribution device has:

a controlling means, a signal transmitting means for transmitting information with other sub power distribution devices via the information transmission signal line and for transmitting information with the controlling means, a trouble detecting means for detecting trouble in a power feed line connected to its own power distribution device, and at least one switch means for breaking the supply of power to the power feed line connected to the its own power distribution; and the controlling means in the main power distribution device and the sub power distribution device control the switch means of their own power distribution devices by referring to the result of detection of the trouble detecting means in their own power distribution devices and the result of detection of trouble in the other power distribution devices received via the information transmission signal line.

5. A vehicular use power feed apparatus as set forth in claim 4, wherein, in an initial state of the vehicular use power feed apparatus, the controlling means of the main power distribution device operates the controlling means of the sub power distribution device via the signal transmitting means and the information transmission signal line to drive the switch means in the sub power distribution devices so that the main power distribution device and at least one sub power distribution device are connected via the power feed lines.

6. A vehicular use power feed apparatus as set forth in claim 4, wherein when any of the trouble detecting means detects trouble, the controlling means in the main power distribution device judges the position of trouble by the transmission information from the controlling means in the sub power distribution device detecting the trouble and transmits a switch means drive signal to the controlling means of the sub power distribution device near the judged position of trouble, and the controlling means receiving the switch means drive signal controls the switch means in the sub power distribution device so as to electrically break the power feed line.

7. A vehicular use power feed apparatus as set forth in claim 4, wherein the sub power distribution device has a rectifying device for providing operating power to the controlling means and the signal transmitting means from the power feed lines connected to the sub power distribution device at both sides.

8. A vehicular use power feed apparatus as set forth in claim 4, wherein provision is made of at least two control use power feed lines for providing control power from the battery for driving the controlling means and the signal transmitting means; and the controlling means in the sub power distribution device and the signal transmitting means receive the drive power from the control use power feed lines via the rectifying device.

9. A vehicular use power feed apparatus as set forth in claim 4, wherein a sensor for detecting shock is provided in the vehicle; and the controlling means in the main power distribution device operates the switch means in the main power distribution device to break the connection in accordance with the detection of shock by the sensor.

10. A vehicular use power feed apparatus as set forth in claim 4, wherein the trouble detecting means in the main power distribution device and the trouble detecting means in the sub power distribution device contain current detecting means for detecting short-circuits of the connected power feed lines; and, at the time of a short-circuit of the power feed lines, the controlling means in the main power distribution device and the controlling means in the sub power distribution device cooperate to drive the switch means to establish a new power feed route.

11. A vehicular use power feed apparatus as set forth in claim 4, wherein the trouble detecting means in the main power distribution device and the trouble detecting means in the sub power distribution device contain voltage detecting means for detecting the disconnection of the connected power feed lines; and, at the time of disconnection of the power feed lines, the controlling means in the main power distribution device and the controlling means in the sub power distribution means cooperate to control the switching means to bypass the disconnection position and establish a new power feed route.

12. A vehicular use power feed apparatus as set forth in claim 4, wherein the battery and the main power distribution device are integrally constituted without a use of external wiring.

13. A vehicular use power feed apparatus as set forth in claim 12, wherein the battery is a secondary battery.

14. A vehicular use power feed apparatus as set forth in claim 4, wherein a semiconductor switching element is provided in each of the at least two control use power feed lines in the main power distribution device; and the controlling means of the main power distribution device controls the vehicular use power feed apparatus to a first state for operating the switch means of the power feed line in the main power distribution device to break the connection in accordance with a state of use of a load recognized by the controlling means of the sub power distribution device, a second state for operating the semiconductor switching element determining an existence of the supply of power from the control power source applied to the controlling means to break the connection when the first state continues for a predetermined time, and a third state for operating the switch means and semiconductor switching element to establish a connection in the normal operation state.

15. A vehicle use power feed apparatus as set forth in claim 4, wherein said battery is built in the main power distribution device.

16. A vehicular use power feed apparatus comprising:

a power feed line for electrically connecting a battery and equipment mounted in a vehicle driven by the battery;

a switch means provided at a predetermined position on the power feed line;

a connection fault detecting means for detecting a connection fault of a section of the power feed line located between it and the adjoining switch means by an overheat detection system; and a controlling means for instructing breakage of the connection to the switch means at the two ends of a section of the power feed line in which a connection fault is detected.

17. A vehicular use power feed apparatus as set forth in claim 16, wherein the connection fault detecting means has an overheat detection line disposed along the power feed line via a material melting by heat generation and held at a predetermined potential;

a potential change detecting means for detecting a change of potential of the overheat detection line; and a connection fault detection unit for detecting a connection fault occurring in the power feed line based on the detected change of potential.

18. A vehicular use power feed apparatus as set forth in claim 16 or 17, wherein the switch means is a relay switch circuit.

19. A vehicular use power feed apparatus comprising:

a battery;

power feed lines for electrically connecting the battery and equipment mounted in the vehicle driven by the battery;

switch means provided at predetermined positions on the power feed lines;

an interference detection use conductive line disposed in a section between adjoining switch means near the periphery of a power feed line or near the periphery of a power feed line via an insulating layer;

an interference detecting means for monitoring a potential of the interference detection use conductive line and detecting the interference of the interference detection use conductive line with the outside based on the result of the monitoring;

a current detecting means for detecting a current flowing through a power feed line;

a current abnormality detecting means for detecting an abnormality in the current based on the detected current;

an interference section specifying means for specifying the section in which the interference occurred in the interference detection use conductive line based on the result of detection of the interference detecting means; and a controlling means for determining a time from the detection of the abnormality in the current to when the connection is to be broke by the switch means or based on the specified section and instructing the breaking of the connection to the switch means based on this determined time.

20. A vehicular use power feed apparatus as set forth in claim 19, wherein the controlling means determines the time so that the switch means near the specified section among a plurality of the switch means breaks the connection in a shorter time from the detection of the abnormality in the current compared with that of a far switch means.

* * * * *